United States Patent
D'Acquisto

(10) Patent No.: US 12,466,876 B2
(45) Date of Patent: Nov. 11, 2025

(54) TESTIS DEVELOPMENT RELATED PROTEIN ANTIBODIES

(71) Applicant: QUEEN MARY UNIVERSITY OF LONDON, Greater London (GB)

(72) Inventor: Fulvio D'Acquisto, Greater London (GB)

(73) Assignee: Queen Mary University of London, London (GB)

( * ) Notice: Subject to any disclaimer, the term of this patent is extended or adjusted under 35 U.S.C. 154(b) by 950 days.

(21) Appl. No.: 17/599,454

(22) PCT Filed: Apr. 2, 2020

(86) PCT No.: PCT/EP2020/059466
§ 371 (c)(1),
(2) Date: Sep. 28, 2021

(87) PCT Pub. No.: WO2020/201462
PCT Pub. Date: Oct. 8, 2020

(65) Prior Publication Data
US 2022/0396613 A1    Dec. 15, 2022

(30) Foreign Application Priority Data

Apr. 3, 2019   (GB) ..................... 1904717

(51) Int. Cl.
| | |
|---|---|
| *A61K 39/395* | (2006.01) |
| *A61P 25/22* | (2006.01) |
| *C07K 16/18* | (2006.01) |
| *A61K 39/00* | (2006.01) |

(52) U.S. Cl.
CPC ............ *C07K 16/18* (2013.01); *A61P 25/22* (2018.01); *A61K 2039/505* (2013.01); *C07K 2317/565* (2013.01); *C07K 2317/76* (2013.01)

(58) Field of Classification Search
None
See application file for complete search history.

(56) References Cited

FOREIGN PATENT DOCUMENTS

| | | |
|---|---|---|
| CN | 102127163 | 7/2011 |
| WO | WO2013088111 | 6/2013 |

OTHER PUBLICATIONS

MacCallum et al. (1996). J. Mol. Biol. 262:732-745.*
De Pascalis et al. (2002). Journal of Immunology. 169:3076-3084.*
Casset et al. (2003). Biochemical and Biophysical Research Communications. 307:198-205.*
Chen et al. (1999). J. Mol. biol. 293:865-881.*
Wu et al. (1999). J. Mol. Biol. 294: 151-162.*
Rudikoff et al. (1982). PNAS. 79:1979-1983.*
Klein et al. (2019) "From gene to disorder in ADHD Mapping mechanisms at different levels of complexity". Proefschrift ter verkrijging van de graad van doctor aan de Radboud Universiteit, pp. 1-266.
Mao et al. (2016) "Original Article TDRP deficiency contributes to low sperm motility and is a potential risk factor for male infertility". Am J Transl Res.pp. 177-187.
Piras et al. (2020) "Immuno-moodulin: A new anxiogenic factor produced by Annexin-A1 transgenic autoimmune-prone T cells". Brain. Behavior and Immunity, XP055700840.
Wang et al. (2010) "Molecular cloning of a novel nuclear factor. TDRP1. In spermatogenic cells of testis and its relationship with spermatogenesis". Biochemical and Biophysical Research Communications. vol. 394. No. 1, pp. 29-35.
Klein et al. (2018) "From Man to Fly Convergent Evidence Links Fbxo25 to ADHD and Comorbid Psychiatric Phenotypes". *Neuropsychopharmacology*, 29(4): S1042-S1043; pp. 1-41.
Shanhua et al. (2016) "TDRP deficiency contributes to low sperm motility and is a potential risk factor for male infertility". *Am J Transl Res*. 8(1): pp. 177-187. PMID: 27069551; PMCID: PMC4759427.

\* cited by examiner

*Primary Examiner* — Christine J Saoud
*Assistant Examiner* — Jon M Lockard
(74) *Attorney, Agent, or Firm* — Pamela J. Sherwood; Bozicevic, Field & Francis LLP

(57) ABSTRACT

This invention relates to the finding that testis development related protein (TDRP; also termed Immunomoodulin or Imood herein) is a circulatory anxiogenic factor that modulates anxiety-like behaviour in mammalian models through the regulation of the immune system. Methods of treatment of mental disorders, such as anxiety, and TDRP antagonists for use in such methods are provided. Methods of diagnosing or monitoring a mental disorder in an individual by determining levels of TDRP in a sample and methods of screening for compounds that reduce levels of TDRP are provided.

6 Claims, 22 Drawing Sheets
Specification includes a Sequence Listing.

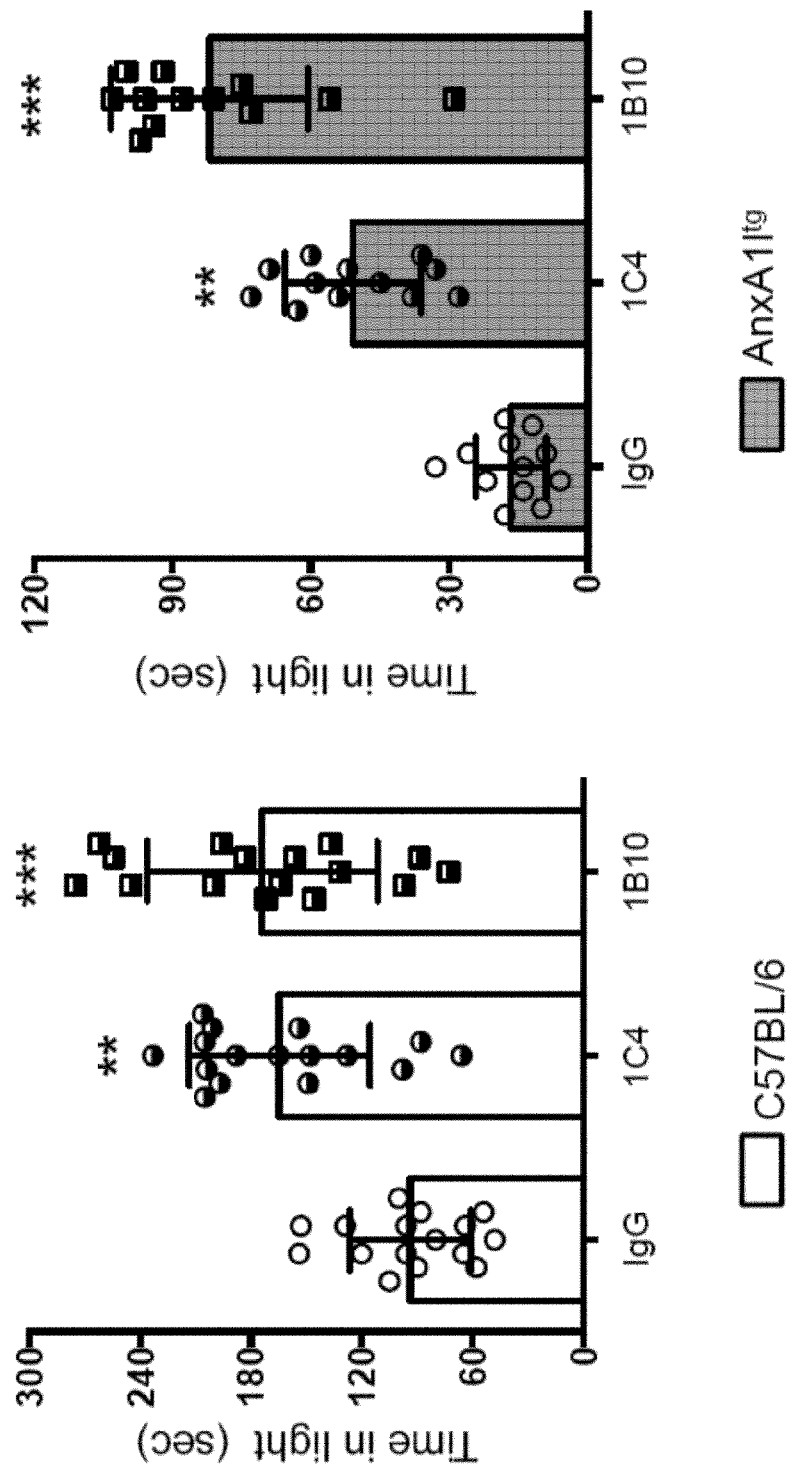
FIGURE 4A – CONTINUED

TESTIS DEVELOPMENT RELATED PROTEIN ANTIBODIES

FIELD

The present invention relates to methods and compounds for the treatment and diagnosis of mental disorders, such as anxiety disorders.

INCORPORATION BY REFERENCE OF SEQUENCE LISTING PROVIDED AS A TEXT FILE

A Sequence Listing is provided herewith in a text file, MEWE-103_SEQ_LIST_ST25 created on May 19, 2022 and having a size of 17,744 bytes of file. The contents of the text file are incorporated herein by reference in its entirety.

BACKGROUND

The challenging life of patients diagnosed with autoimmune diseases is often further impoverished by the emergence of mental disorders as a major co-morbidity[1,2]. For instance, ~40% of patients suffering from multiple sclerosis have attempted suicide[3,4] while more than 30% of those affected by autoimmune hepatitis suffer from schizophrenia[5,6]. Most strikingly, immunomodulatory therapies for the treatment of autoimmune conditions might aggravate the emergence of these problems[7] thus presenting both clinicians and patients with a paradoxical dilemma: the physical symptoms of autoimmunity might be effectively improved at the expenses of a worsening of the emotional state and wellbeing. This is for instance the case of interferon beta (IFN-β) that is currently used as an effective treatment for multiple sclerosis but its use is limited by the increased incidence of suicidal thoughts in a significant proportion of patients[8]. Although some studies have investigated the functional cross-talk between the brain and the immune system[9,10], it is still not clear how one system influences the other and if there is a common root or determinant for the emergence of mental disorders in autoimmune conditions.

Annexin-A1 (AnxA1) is an endogenous modulator of a variety of physiological and pathological processes ranging from inflammation[11-14] to autoimmunity[15,16] and cancer[17-20]. As with many other multifunctional mediators, AnxA1 plays a homeostatic role in the immune system as it can exert both positive and negative functions depending on the contexts. In the contexts of T cells, studies have indeed provided contrasting and opposite results showing that it can act as both a positive[21-30] and a negative modulator of T cell activation[30-33]. All these studies have been done using either exogenously administered recombinant AnxA1 (or its mimetic) or AnxA1-deficient mice where the protein is absent in every immune cells.

SUMMARY

The present inventors have recognised that testis development related protein (TDRP) is a circulatory anxiogenic factor that modulates anxiety-like behaviour in mammalian models. TDRP (also termed Immuno-moodulin or Imood herein) may be useful, for example, as a therapeutic target in the treatment of mental disorders, or as a biomarker in the diagnosis, prognosis, monitoring or assessment of mental disorders.

A first aspect of the invention provides a method of treating mental disorder comprising administering a TDRP antagonist to an individual in need thereof.

A second aspect of the invention provides a TDRP antagonist for use in a method according to the first aspect.

A third aspect of the invention provides the use of a TDRP antagonist in the manufacture of a medicament for use in a method according to the first aspect.

A fourth aspect of the invention provides a pharmaceutical composition comprising a therapeutically effective amount of TDRP antagonist, and a pharmaceutically acceptable excipient.

The pharmaceutical composition of the fourth aspect of the invention may be useful in the first, second and third aspects of the invention.

Suitable TDRP antagonists for use in the first to fourth aspects include antibody molecules and are described elsewhere herein.

A fifth aspect of the invention provides a method of determining the anxiety of an individual comprising;
determining the level or amount of TDRP in a sample obtained from an individual.

A sixth aspect of the invention provides a method of diagnosing a mental disorder in an individual; or identifying an individual at increased risk of suffering from a mental disorder, the method comprising;
determining the level or amount of TDRP in a sample obtained from an individual.

A seventh aspect of the invention provides a method of monitoring an individual undergoing treatment comprising;
determining the level or amount of TDRP in a sample obtained from an individual undergoing treatment.

The individual may for example be undergoing treatment for an immune condition or a mental disorder.

An eighth aspect of the invention provides a method of screening for a compound with therapeutic activity against a mental disorder comprising;
determining the effect of a test compound on the level or amount of TDRP in a non-human mammal,
a decrease in level or amount of TDRP being indicative that the compound has therapeutic activity against a mental disorder.

Therapeutic activity against a mental disorder may include anxiolytic activity.

A ninth aspect of the invention provides a method of determining the activation of T cells in an individual comprising;
determining the expression of TDRP in a sample of T cells obtained from the individual.

Other aspects and embodiments of the invention are described in more detail below.

DETAILED DESCRIPTION

Figure 1A:
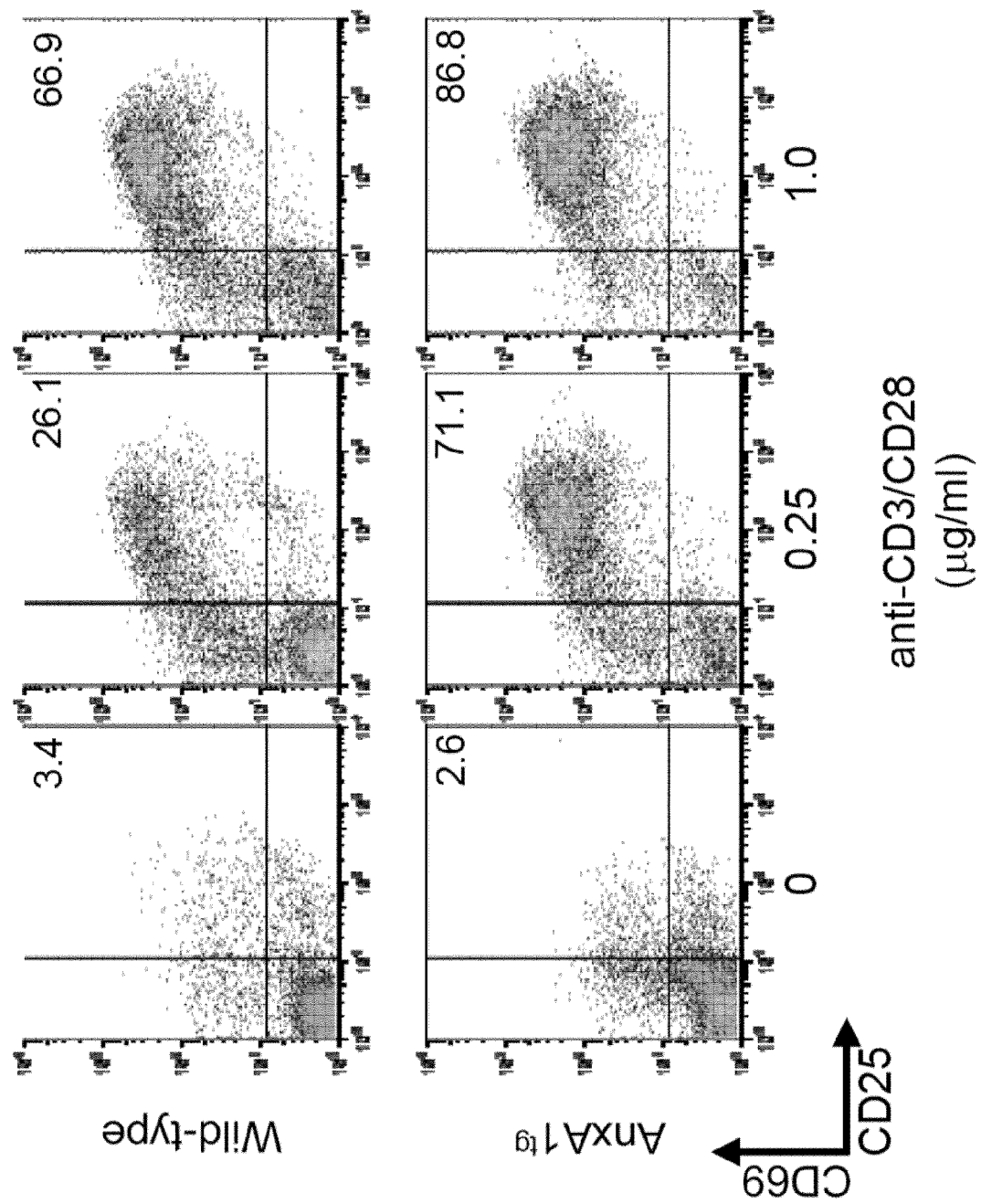
FIG. 1 shows the autoimmune-prone phenotype of T-cell specific AnxA1$^{tg}$ mice. (1A) T cells from control and AnxA1$^{tg}$ mice were stimulated with the indicated concentration of plate-bound anti-CD3 plus anti-CD28 for 16-18 hrs and then stained with and -CD69 and anti-CD25 and analyzed by FACS. The numbers in the plot show the percentages of CD69 and CD25 double positive populations. Results are from a single experiment and are representative of n=12-18 experiments with similar results. (1B) T cells from control and AnxA1$^{tg}$ mice were stimulated with the indicated concentration of plate-bound anti-CD3 plus anti-CD28 for 24-30 hr and the supernatants used to measure the levels of IL-2. The bars show means±SEM from a single experiment with T cells obtained n=6 separate mice and are representative of n=4-5 experiments with similar results. p<0.01; *p<0.001. (1C) Control and AnxA1$^{tg}$ mice were immunized with MOG$_{35-55}$ and CFA and monitored daily for clinical signs of EAE (top left panel) or weight gain/loss (top right panel) for 23 days. Results show means±SEM from single experiment with n=10 mice per group and are representative of n=7-8 experiments with similar results. *p<0.05; *p<0.001. The spinal cord section showed in the bottom left panels were obtained at day 18 and stained with hematoxilyn and eosin as described in Materials and Methods. The table in the bottom right corner shows the number of mice showing a score of 2 at different times during the development of the EAE. (1D) Control and AnxA1$^{tg}$ mice received an intraperitoneal injection of pristane to induce a lupus-like disease and were monitored daily for survival (left panel) or weight gain/loss (right panel) for 35 days. Results are from single experiment with n=10 mice per group and are representative of n=3 experiments with similar results. *p<0.001.

This invention relates to the recognition that TDRP is an anxiogenic factor released by T cells that modulates emotional and anxiety behaviour in mammals. TDRP may be useful for example as a biomarker for the diagnosis and prognosis of mental disorders and a target for intervention in the treatment of mental disorders.

Testis development related protein (TDRP) (Gene ID No: 157695; 2610019F03Rik; also known as Inm01; TDRP1; TDRP2; and C8orf42 and referred to as "Immuno-moodulin" or "Imood" herein) may be mouse or more preferably human TDRP.

Human TDRP may have the amino acid sequence of database accession number NP_001243042.1 (SEQ ID NO: 1), NP_778250.2 (SEQ ID NO: 2), or a variant of any one of these. TDRP may be encoded by the nucleotide sequence of database accession number NM_001256113.1, NM_175075.4 or a variant of either of these, such as an isoform or allelic variant.

Mouse TDRP may have the amino acid sequence of database accession number AA145287.1 (SEQ ID NO: 17), or a variant thereof. Mouse TDRP may be encoded by the nucleotide sequence of database accession number NM_001361625.1 or a variant thereof, such as an isoform or allelic variant.

A variant of a reference TDRP amino acid or nucleotide sequence may have a sequence having at least 80%, at least 85%, at least 90%, at least 95% or at least 98% sequence identity to the reference amino acid or nucleotide sequence. Sequence identity is generally defined with reference to the algorithm GAP (GCG Wisconsin Package™, Accelrys, San Diego CA). GAP uses the Needleman & Wunsch algorithm (J. Mol. Biol. (48): 444-453 (1970)) to align two complete sequences that maximizes the number of matches and minimizes the number of gaps. Generally, the default parameters are used, with a gap creation penalty=12 and gap extension penalty=4. Use of GAP may be preferred but other algorithms may be used, e.g. BLAST or TBLASTN (which use the method of Altschul et al. (1990) *J. Mol. Biol.* 215: 405-410), FASTA (which uses the method of Pearson and Lipman (1988) *PNAS USA* 85: 2444-2448), or the Smith-Waterman algorithm (Smith and Waterman (1981) *J. Mol Biol.* 147: 195-197), generally employing default parameters.

Particular amino acid sequence variants may differ from a given sequence by insertion, addition, substitution or deletion of 1 amino acid, 2, 3, 4, 5, 6, 7, 8, 9, 10, 10-20 or 20-30 amino acids. In some embodiments, a variant sequence may comprise the reference sequence with 1, 2, 3, 4, 5, 6, 7, 8, 9, 10 or more residues inserted, deleted or substituted. For example, up to 15, up to 20, up to 30, up to 40, up to 50 or up to 60 residues may be inserted, deleted or substituted.

In some embodiments, TDRP may be useful as a biomarker for the diagnosis or prognosis of mental disorders. For example, the level or amount of TDRP protein or encoding nucleic acid in a sample obtained from an individual may provide diagnostic or prognostic information about a mental disorder in the individual or may be indicative or predictive of the emotional or anxious state of the individual.

In some embodiments, the level or amount of TDRP in a sample from an individual may be indicative of the severity of a mental disorder in the individual. For instance, an increased level or amount of TDRP may be indicative of increased severity. For example, a plasma concentration of 1-5 ng/ml of TDRP may be indicative of mild mental disorder and a plasma concentration of 50-80 ng/ml of TDRP may be indicative of severe mental disorder.

In other embodiments, the level or amount of TDRP in a sample from an individual may be indicative or diagnostic of the type of mental disorder in the individual.

A method of (i) diagnosing or prognosing a mental disorder in an individual, (ii) identifying an individual at increased risk of suffering from a mental disorder or (iii) determining the anxiety level of an individual may comprise;

determining the presence, level or amount of TDRP in a sample obtained from an individual.

In some embodiments, the level or amount of TDRP in the sample obtained from the individual may be compared to a control or threshold. Suitable controls may include the level or amount of TDRP in a control sample or the mean level or amount of TDRP in a set of control samples obtained from a group of healthy individuals not suffering from a mental disorder. Suitable control samples may be obtained from healthy age-matched and gender matched volunteers not suffering from a mental disorder (i.e. with no diagnosis of mental disorder).

An increased level or amount of TDRP in the sample obtained from an individual relative to the control may be indicative that the individual is suffering from or at increased risk of a mental disorder or has an elevated anxiety level.

In other embodiments, the level or amount of TDRP may be determined in samples obtained from the individual over a time period, for example 1 day, 1 week or 1 month. An increasing level or amount of TDRP over time, for example an increased level or amount of TDRP in the sample obtained from an individual at a second time point relative to a first time point, may be indicative that the individual is suffering from or at increased risk of a mental disorder or has an elevated anxiety level.

A sample suitable for use in accordance with the present methods may include a sample of serum, plasma, lymph, white blood cells, blood, blood fractions, urine, synovial fluid, spinal fluid, saliva, mucous, tears and sweat. Plasma, serum, saliva or urine may be preferred in some embodiments.

In some embodiments, a sample may comprise blood cells, such as peripheral blood mononuclear cells (PBMCs), from the individual.

The presence, level or amount of TDRP in the sample may be determined by any convenient means and many suitable techniques are known in the art.

The mode of determining binding is not a feature of the present invention and those skilled in the art are able to choose a suitable mode according to their preference and general knowledge. Suitable approaches for determining the presence or amount of TDRP as described above include protein based methods, such as Western Blotting, immuno-fluorescence, enzyme linked immunosorbent assays (ELISA), mass spectroscopy (MS), radioimmunoassays (RIA), immunoradiometric assays (IRMA), fluorescence-activated cell sorting (FACS), flow cytofluorometry (FC), mass cytometry (CyTOF) and immunoenzymatic assays (IEMA), including sandwich assays using monoclonal and/or polyclonal antibodies, and nucleic acid based methods, such as Northern Blotting, RT-PCR and microarray analysis. All of these approaches are well known in the art. In some preferred embodiments, ELISA, FACS or RT-PCR may be used.

In some embodiments, a sample obtained from the individual may be contacted with a recognition agent, such as an antibody molecule. Binding of TDRP in the sample to the recognition agent may then be determined.

Any appropriate means may be used to determine the binding of the recognition agent. Tagging with individual reporter molecules is one possibility. The reporter molecules may directly or indirectly generate detectable, and preferably measurable, signals. The linkage of reporter molecules may be direct or indirect, covalent, e.g. via a peptide bond, or non-covalent. Linkage via a peptide bond may be as a result of recombinant expression of a gene fusion, encoding antibody and reporter molecule. For example, a recognition agent, such as an antibody, may be labelled with a fluoro-phore such as FITC or rhodamine, a radioisotope, or a non-isotopic-labelling reagent such as biotin or digoxigenin; recognition agents containing biotin may be detected using "detection reagents" such as avidin conjugated to any desirable label such as a fluorochrome. Another possibility is to detect the binding of a recognition agent to TDRP using a second recognition agent, for example in an immunoassay system. Depending on the assay format employed, the second recognition agent may be immobilised or labelled with a detectable label.

Preferably, the recognition agent is an antibody molecule. The presence or amount of TDRP in the sample may be determined for example, by measuring immunocomplex formation between the antibody molecule and TDRP in the sample. The presence or extent of binding may for example be indicated by an agglutination reaction or by a visualisable change such as a colour change or fluorescence, e.g. immunostaining, or by a quantitative method such as in use of radio-immunological methods or enzyme-linked antibody methods In some preferred embodiments, an immunoassay may be used to determine the presence, amount or concentration of TDRP in a sample. Examples of immunoassays are antibody capture assays, two-antibody sandwich assays, ELISA assays and antigen capture assays. In a sandwich immunoassay, two antibodies capable of binding TDRP generally are used, e.g. one immobilised onto a solid support, and one free in solution and labelled with a detectable chemical compound. Examples of chemical labels that may be used for the second antibody include radioisotopes, fluorescent compounds, spin labels, coloured particles such as colloidal gold and coloured latex, and enzymes or other molecules that generate coloured or electrochemically active products when exposed to a reactant or enzyme substrate. When a sample containing TDRP is placed in this system, the TDRP binds to both the immobilised antibody and the labelled antibody, to form a "sandwich" immune complex on the support's surface. The complexed protein is detected by washing away non-bound sample components and excess labelled antibody, and measuring the amount of labelled antibody complexed to protein on the support's surface. Alternatively, the antibody free in solution, which can be labelled with a chemical moiety, for example, a hapten, may be detected by a third antibody labelled with a detectable moiety which binds the free antibody or, for example, the hapten coupled thereto. Preferably, the immunoassay is a solid support-based immunoassay. Alternatively, the immunoassay may be one of the immunoprecipitation techniques known in the art, such as, for example, a nephelometric immunoassay or a turbidimetric immunoassay. When Western blot analysis or an immunoassay is used, preferably it includes a conjugated enzyme labelling technique.

Although the recognition agent will conveniently be an antibody, other recognition agents are known or may become available, and can be used in the present invention. For example, antigen binding domain fragments of antibodies, such as Fab fragments, can be used. Also, so-called RNA aptamers may be used. Therefore, unless the context specifically indicates otherwise, the term "antibody" as used herein is intended to include other recognition agents. Where antibodies are used, they may be polyclonal or monoclonal. Optionally, the antibody can be produced by a method such that it recognizes a preselected epitope from TDRP In other embodiments, the presence or amount of nucleic acid encoding TDRP may be determined in the sample. Suitable methods are well known in the art.

In some embodiments, the individual may have a disease condition, such as an immune condition, an immune-related condition, or a mental disorder.

The individual may be undergoing treatment for the disease condition. For example, the methods described herein may be useful in determining the onset or risk of onset of a mental disorder in patients undergoing treatment. A method of monitoring an individual undergoing treatment may comprise;

determining the level or amount of TDRP in an sample obtained from an individual undergoing treatment.

The individual may be undergoing treatment for an immune condition, such as an autoimmune disorder. For example, the individual may be undergoing treatment with an immunomodulatory drug, such as a non-steroidal anti-inflammatory drug (NSAID) or an immunosuppressant, such as IFN-β, corticosteroid, mTOR inhibitor, calcineurin inhibitor, Janus kinase inhibitor, IMDH inhibitor, anti-CD3 antibodies, anti-CD25 antibodies, anti-TNF antibodies, such as adalimumab and anti-TNF receptors, such as infliximab.

Autoimmune disorders, for example T-cell dependent autoimmune diseases, may include multiple sclerosis, autoimmune hepatitis, type I diabetes, celiac disease, Grave's disease, inflammatory bowel disease (IBD), psoriasis, rheumatoid arthritis, systemic lupus erythematosus, myasthenia gravis, Idiopathic thrombocytopenic purpura, ankylosis spondylitis and anti-phospholipid syndrome. For example, the individual may be undergoing treatment for multiple sclerosis with IFN-β.

The individual may be undergoing treatment for an immune-related condition. Immune-related conditions may include atherosclerosis, Alzheimer's disease and Parkinson's disease.

The individual may be undergoing treatment for a mental disorder, such as an anxiety disorder. The individual may be undergoing treatment for the mental disorder. For example, the individual may be undergoing treatment with an antipsychotic, anxiolytic, tranquiliser, mood stabiliser, or antidepressant drug or a non-medicative therapy, such as talking therapy, cognitive behavioral therapy (CBT or relaxation techniques.

In some embodiments, the presence of an elevated level or amount of TDRP relative to controls in a sample obtained from an individual with an autoimmune disorder may be indicative that the individual has a mental disorder as well as the autoimmune disorder. In additional to treatment for the autoimmune disorder, the individual may be treated for the mental disorder, for example with a treatment set out above or with a TDRP antagonist as described herein, for example an anti-TDRP antibody, such as 1B10 or 1C4. The absence of an elevated level or amount of TDRP relative to controls in a sample obtained from an individual with an autoimmune disorder may be indicative that the individual does not have a mental disorder. The individual may be treated for the autoimmune disorder, for example with a treatment set out above.

The identification of TDRP as a biomarker indicative of a mental disorder also provides a readily measurable proxy for monitoring the progression, or regression, of the mental disorder. Thus, a treatment intended to reduce or eliminate a mental disorder or a symptom thereof should also reduce or eliminate TDRP.

Accordingly, a method of assessing the efficacy of a drug in treating a mental disorder in an individual may comprise assessing the effect of the drug on the expression, level, amount or concentration of TDRP. For example, the expression, level, amount or concentration of TDRP may be determined in samples obtained from the individual before administration of the drug and after administration of the drug. A reduction in TDRP expression, level, amount or concentration is indicative of the efficacy of the drug in treating the mental disorder.

An increase or reduction in TDRP expression, level, amount or concentration as described herein may be a significant increase or reduction in TDRP. Significance may be measured, for example, using a t-test, such as Student's t-test or Welch's t-test with a significance level of p<0.001 indicating a significant increase or reduction. In other embodiments, a significance level of p<0.05, such as p<0.01 or p<0.005 may indicate a significant increase or reduction.

In some embodiments, an increase or reduction in TDRP expression, level, amount or concentration may be significant if the TDRP expression, level, amount or concentration in a test sample is at least 110%, is at least 115%, is at least 120%, is at least 125%, at least 130%, at least 135%, at least 140%, at least 145%, at least 150%, at least 155%, at least 160%, at least 165%, at least 170%, at least 175%, at least 180%, at least 185%, at least 190%, at least 195%, or at least 200% of the TDRP expression, level, amount or concentration in a reference or control sample.

Mental disorders as described herein are clinically significant behavioural or psychological conditions that are characterized by distress, disability or increased risk of death, pain, disability or loss of freedom.

Mental disorders may include anxiety disorders, depression, suicidal ideation and schizophrenia. Anxiety disorders are characterized by significant feelings of anxiety and fear. Anxiety disorders may include obsessive compulsive disorder (OCD), generalised anxiety disorder, agoraphobia, panic disorder, phobia, post-traumatic stress disorder and social anxiety disorder. In some embodiments, mental disorders as described herein may not include attention deficit hyperactivity disorder (ADHD). In some embodiments, mental disorders as described herein may not include schizophrenia.

Criteria for the diagnosis of mental disorders, including anxiety disorders, are set out in The Diagnostic and Statistical Manual of Mental Disorders, 5th Edition (American Psychiatric Association; also known as the DSM-5).

In other embodiments, TDRP may be a therapeutic target for the treatment of mental disorders. For example, a method of treatment of a mental disorder in an individual in need thereof may comprise administering a TDRP antagonist to the individual. Related aspects provide a TDRP antagonist for use in such a method of treatment and the use of a TDRP antagonist in the manufacture of a medicament for use in such a method of treatment.

A TDRP antagonist is an agent or compound that reduces the expression, activity, level, amount and/or concentration of TDRP in the individual, in particular, the expression, activity, level, amount and/or concentration of TDRP in the plasma or serum of the individual.

A TDRP antagonist may inhibit, block or interfere with the interaction of TDRP with a receptor, ligand or binding partner, or may reduce or inhibit secretion of TDRP into the plasma or serum of the individual.

A TDRP antagonist may reduce the expression of TDRP in the individual, for example in blood cells of the individual such as PBMCs, or may reduce or decrease the level, amount, concentration or activity of TDRP in the blood or serum of the individual. A TDRP antagonist as described herein may be an inverse agonist of TDRP.

Suitable TDRP antagonists include small organic molecules, receptors, antibody molecules, aptamers, targeted gene editing systems, such as CRISPR/Cas9 and suppressor nucleic acids, such as RNAi and antisense.

In some preferred embodiments, a TDRP antagonist may be an antibody molecule that specifically binds to TDRP.

An antibody molecule is an immunoglobulin whether natural or partly or wholly synthetically produced. The term also relates to any polypeptide or protein comprising an antibody antigen-binding site. Antibodies may have been isolated or obtained by purification from natural sources, or else obtained by genetic recombination, or by chemical synthesis, and that they may contain unnatural amino acids.

An antigen binding site is the part of a molecule that recognises and binds to all or part of a target antigen. In an antibody molecule, it is referred to as the antibody antigen-binding site or paratope, and comprises the part of the antibody that recognises and binds to all or part of the target antigen. Where an antigen is large, an antibody may only bind to a particular part of the antigen, which part is termed an epitope. An antibody antigen-binding site may be provided by one or more antibody variable domains. An antibody antigen-binding site preferably comprises an antibody light chain variable region (VL) and an antibody heavy chain variable region (VH).

An antigen binding site may be provided by means of arrangement of complementarity determining regions (CDRs). The structure for carrying a CDR or a set of CDRs will generally be an antibody heavy or light chain sequence or substantial portion thereof in which the CDR or set of CDRs is located at a location corresponding to the CDR or set of CDRs of naturally occurring VH and VL antibody variable domains encoded by rearranged immunoglobulin genes. The structures and locations of immunoglobulin variable domains may be determined by reference to Kabat et al. (1987) (Sequences of Proteins of Immunological Interest. 4$^{th}$ Edition. US Department of Health and Human Services.), and updates thereof, now available on the Internet (at immuno.bme.nwu.edu or find "Kabat" using any search engine).

By CDR region or CDR, it is intended to indicate the hypervariable regions of the heavy and light chains of the immunoglobulin as defined by Kabat et al. (1987) Sequences of Proteins of Immunological Interest, 4$^{th}$ Edition, US Department of Health and Human Services (Kabat et al., (1991a), Sequences of Proteins of Immunological Interest, 5$^{th}$ Edition, US Department of Health and Human Services, Public Service, NIH, Washington, and later editions). An antibody typically contains 3 heavy chain CDRs and 3 light chain CDRs. The term "CDR" or "CDRs" may indicate, according to the case, one of these regions or several, or even the whole, of these regions which contain the majority of the amino acid residues responsible for the binding by affinity of the antibody for the antigen or the epitope which it recognizes.

Among the six short CDR sequences, the third CDR of the heavy chain (HCDR3) has a greater size variability (greater diversity essentially due to the mechanisms of arrangement of the genes which give rise to it). It can be as short as 2 amino acids although the longest size known is 26. Functionally, HCDR3 plays a role in part in the determination of the specificity of the antibody (Segal et al., (1974), PNAS, 71:4298-4302; Amit et al., (1986), Science, 233:747-753; Chothia et al., (1987), J. Mol. Biol., 196:901-917; Chothia et al., (1989), Nature, 342:877-883; Caton et al., (1990), J. Immunol., 144:1965-1968; Sharon et al., (1990a), PNAS, 87:4814-4817; Sharon et al., (1990b), J. Immunol., 144: 4863-4869; Kabat et al., (1991b), J. Immunol., 147:1709-1719).

As antibodies can be modified in a number of ways, the term "antibody" should be construed as covering any specific binding member or substance having an antibody antigen-binding site with the required specificity and/or binding, for example to TDRP. Thus, this term covers antibody fragments, in particular antigen-binding fragments, and derivatives, including any polypeptide comprising an antibody antigen-binding site, whether natural or wholly or partially synthetic. Chimeric molecules comprising an antibody antigen-binding site, or equivalent, fused to another polypeptide (e.g. belonging to another antibody class or subclass) are therefore included. Cloning and expression of chimeric antibodies are described in EP-A-0120694 and EP-A-0125023, and a large body of subsequent literature.

As mentioned above, fragments of a whole antibody can perform the function of binding an antigen. Examples of binding fragments are (i) the Fab fragment consisting of VL, VH, CL and CH1 domains; (ii) the Fd fragment consisting of the VH and CH1 domains; (iii) the Fv fragment consisting of the VL and VH domains of a single antibody; (iv) the dAb fragment (Ward et al. (1989) Nature 341, 544-546; McCafferty et al., (1990) Nature, 348, 552-554; Holt et al. (2003) Trends in Biotechnology 21, 484-490), which consists of a VH or a VL domain; (v) isolated CDR regions; (vi) F(ab')2 fragments, a bivalent fragment comprising two linked Fab fragments (vii) single chain Fv molecules (scFv), wherein a VH domain and a VL domain are linked by a peptide linker which allows the two domains to associate to form an antigen binding site (Bird et al. (1988) Science, 242, 423-426; Huston et al. (1988) PNAS USA, 85, 5879-5883); (viii) bispecific single chain Fv dimers (PCT/US92/09965); (ix) "diabodies", multivalent or multispecific fragments constructed by gene fusion (WO94/13804; Holliger et al. (1993a), Proc. Natl. Acad. Sci. USA 90 6444-6448) and (x) a single chain diabody format wherein each of the VH and VL domains within a set is connected by a short or 'non-flexible' peptide linker. Fv, scFv or diabody molecules may be stabilized by the incorporation of disulphide bridges linking the VH and VL domains (Reiter et al. (1996), Nature Biotech, 14, 1239-1245). A single chain Fv (scFv) may be comprised within a mini-immunoglobulin or small immunoprotein (SIP), e.g. as described in (Li et al., (1997), Protein Engineering, 10: 731-736). A SIP may comprise an scFv molecule fused to the CH4 domain of the human IgE secretory isoform IgE-S2 ($\varepsilon_{S2}$-CH4; Batista et al., (1996), J. Exp. Med., 184: 2197-205) forming a homo-dimeric mini-immunoglobulin antibody molecule. Minibodies comprising a scFv joined to a CH3 domain may also be made (Hu et al. (1996), Cancer Res., 56(13):3055-61). Other examples of binding fragments are Fab', which differs from Fab fragments by the addition of a few residues at the carboxyl terminus of the heavy chain CH1 domain, including one or more cysteines from the antibody hinge region, and Fab'-SH, which is a Fab' fragment in which the cysteine residue(s) of the constant domains bear a free thiol group. Preferred antibody molecules may include human or humanised antibody molecules.

Suitable antibody molecules may specifically bind to TDRP, for example in immunoprecipitation experiments, and may for example reduce anxiety-like behaviour in murine models.

Antibody molecules that specifically bind to TDRP may be produced using conventional techniques, including for example genetic immunisation (see for example Bates et al Biotechniques (2006) 40(2) 199-208). Suitable protein sequences for immunisation to generate antibody molecules that specifically bind to TDRP may include SEQ ID NO: 1, SEQ ID NO: 2 or SEQ ID NO: 17.

Suitable antibody molecules for use as described herein include monoclonal antibodies, such as 1B10 and 1C4, as described herein.

In some embodiments, a 1B10 antibody molecule may comprise a VH domain and a VL domain; wherein the VH domain comprises a VHCDR1 of SEQ ID NO: 3 or a variant thereof, a VHCDR2 of SEQ ID NO: 4 or a variant thereof, and a VHCDR3 of SEQ ID NO: 5 or a variant thereof; and the VL domain comprises a VLCDR1 of SEQ ID NO: 6 or a variant thereof, a VLCDR2 of SEQ ID NO: 8 or a variant thereof, and a VLCDR3 of SEQ ID NO: 10 or a variant thereof. In other embodiments, the VL domain of a 1B10 antibody may comprise a VLCDR1 of SEQ ID NO: 7 or a variant thereof, a VLCDR2 of SEQ ID NO: 9 or a variant thereof, and a VLCDR3 of SEQ ID NO: 10 or a variant thereof.

The antibody molecule may bind specifically to TDRP.

The VH domain of a 1B10 antibody molecule described herein may comprise the amino acid sequence of SEQ ID NO: 11 or a variant thereof; or the amino acid sequence of SEQ ID NO: 11 with independently 1 or more, for example 2, 3, or 4 or more amino acid substitutions, deletions or insertions in the framework regions. The substitutions may be conservative substitutions. The VH domain may be encoded by the nucleotide sequence of SEQ ID NO: 12 or a variant thereof.

The VL domain of a 1B10 antibody molecule described herein may comprise the amino acid sequence of SEQ ID NO: 13 or SEQ ID NO: 14 or a variant of either of these; or the amino acid sequence of SEQ ID NO: 13 or SEQ ID NO: 14 with independently 1 or more, for example 2, 3, or 4 or more amino acid substitutions, deletions or insertions in the framework regions. The substitutions may be conservative substitutions. The VL domain may be encoded by the nucleotide sequence of SEQ ID NO: 15 or SEQ ID NO: 16 or a variant of either one of these.

A 1C4 antibody molecule may comprise a VH domain and a VL domain; wherein the VH domain comprises a VHCDR1 of SEQ ID NO: 18 or a variant thereof, a VHCDR2 of SEQ ID NO: 19 or a variant thereof, and a VHCDR3 of SEQ ID NO: 20 or a variant thereof; and the VL domain comprises a VLCDR1 of SEQ ID NO: 21 or a variant thereof, a VLCDR2 of SEQ ID NO: 22 or a variant thereof, and a VLCDR3 of SEQ ID NO: 23 or a variant thereof.

The antibody molecule may bind specifically to TDRP.

The VH domain of a 1C4 antibody molecule described herein may comprise the amino acid sequence of SEQ ID NO: 24 or a variant thereof; or the amino acid sequence of SEQ ID NO: 24 with independently 1 or more, for example 2, 3, or 4 or more amino acid substitutions, deletions or insertions in the framework regions. The substitutions may be conservative substitutions. The VH domain may be encoded by the nucleotide sequence of SEQ ID NO: 25 or a variant thereof.

The VL domain of a 1C4 antibody molecule described herein may comprise the amino acid sequence of SEQ ID NO: 26 or a variant thereof; or the amino acid sequence of SEQ ID NO: 26 with independently 1 or more, for example 2, 3, or 4 or more amino acid substitutions, deletions or insertions in the framework regions. The substitutions may be conservative substitutions. The VL domain may be encoded by the nucleotide sequence of SEQ ID NO: 27 or a variant thereof A protein described herein that is a variant of a reference sequence, such as a CDR, VH or VL domain sequence described herein, may have 1 or more amino acid residues or nucleotides altered relative to the reference sequence. For example, 20 or fewer amino acid residues or nucleotides may be altered relative to the reference sequence, preferably, 15 or fewer, 10 or fewer, 5 or fewer or 3 or fewer, 2 or 1. For example, a variant described herein may comprise the sequence of a reference sequence with 20 or fewer, 15 or fewer, 10 or fewer, 5 or fewer, 3 or fewer, 2 or 1 amino acid residues or nucleotides mutated. For example, a variant described herein may comprise an amino acid sequence with 20 or fewer, 15 or fewer, 10 or fewer, 5 or fewer, 3 or fewer, 2 or 1 amino acid residue altered relative to any one of SEQ ID NOs: 1 to 9, 11, 14-20, and 22. The one or more altered residues are preferably in the framework regions of a VH or VL domain sequence described herein. For example, a variant of a VH or VL domain sequence described herein may comprise a set of VHCDRs 1-3 and VLCDRs 1-3 disclosed herein. A variant of a VH or VL domain sequence described herein may for example comprise 1, 2, 3 or 4 amino acid substitutions in the framework regions.

An amino acid residue in the reference sequence may be altered or mutated by insertion, deletion or substitution, preferably substitution for a different amino acid residue. Such alterations may be caused by one or more of addition, insertion, deletion or substitution of one or more nucleotides in the encoding nucleic acid.

A protein or polynucleotide as described herein that is a variant of a reference sequence, such as a VH or VL domain sequence described herein, may share at least 50% sequence identity with the reference amino acid or polynucleotide sequence, at least 55%, at least 60%, at least 65%, at least 70%, at least about 80%, at least 90%, at least 95%, at least 98% or at least 99% sequence identity. For example, a variant of a protein described herein may comprise an amino acid sequence that has at least 50% sequence identity with the reference amino acid sequence, at least 55%, at least 60%, at least 65%, at least 70%, at least about 80%, at least 90%, at least 95%, at least 98% or at least 99% sequence identity with the reference amino acid sequence, for example any one of SEQ ID NOs: 1 to 9, or 11. Preferably, a variant of a VH or VL domain sequence comprises a set of VHCDRs 1-3 and VLCDRs 1-3 disclosed herein: i.e. sequence variation relative to the reference sequence preferably occurs outside the CDRs, in the framework regions of a variable domain.

Sequence identity is commonly defined with reference to the algorithm GAP (Wisconsin GCG package, Accelerys Inc, San Diego USA). GAP uses the Needleman and Wunsch algorithm to align two complete sequences that maximizes the number of matches and minimizes the number of gaps. Generally, default parameters are used, with a gap creation penalty=12 and gap extension penalty=4. Use of GAP may be preferred but other algorithms may be used, e.g. BLAST (which uses the method of Altschul et al. (1990) (Altschul et al., 1990), FASTA (which uses the method of Pearson and Lipman (Pearson and Lipman, 1988)), or the Smith-Waterman algorithm (Smith and Waterman, 1981), or the TBLASTN program (Altschul et al., 1990), supra, generally employing default parameters. In particular, the psi-Blast algorithm may be used (Altschul et al., 1997). Sequence identity and similarity may also be determined using Genomequest™ software (Gene-IT, Worcester MA USA).

Sequence comparisons are preferably made over the full-length of the relevant sequence described herein.

The terms "immunoglobulin", "antibody molecule" and "antibody" may be used interchangeably to refer to any protein comprising an antibody antigen-binding site which has the ability to specifically bind TDRP.

A suitable anti-TDRP antibody may include the antibody produced by the hybridoma deposited under the Budapest Treaty with the European Collection of Authenticated Cell Cultures (ECACC) by Prof Fulvio D'Acquisto and known as BLP-1B10-G2, or the antibody produced by the hybridoma deposited with ECACC by Prof Fulvio D'Acquisto and known as BLP-1C4-67/F6-D3.

An individual suitable for treatment as described above may be a mammal, such as a rodent (e.g. a guinea pig, a hamster, a rat, a mouse), murine (e.g. a mouse), canine (e.g. a dog), feline (e.g. a cat), equine (e.g. a horse), a primate, simian (e.g. a monkey or ape), a monkey (e.g. marmoset, baboon), an ape (e.g. gorilla, chimpanzee, orang-utan, gibbon), or a human.

In some preferred embodiments, the individual is a human. In other preferred embodiments, non-human mammals, especially mammals that are conventionally used as models for demonstrating therapeutic efficacy in humans (e.g. murine, primate, porcine, canine, or leporid) may be employed.

An individual with mental disorder may display at least one identifiable sign, symptom, or laboratory finding that is sufficient to make a diagnosis of mental disorder in accordance with clinical standards known in the art. Examples of such clinical standards can be found in textbooks of medicine, such as The Diagnostic and Statistical Manual of Mental Disorders, 5th Edition. In some embodiments, the individual may have been previously identified or diagnosed with mental disorder or a method of the invention may comprise identifying or diagnosing the presence of a mental disorder in the individual, prognosing a mental disorder or assessing the risk of onset of a mental disorder, for example by determining the level or amount of TDRP in a sample obtained from the individual as described herein.

Treatment may be any treatment or therapy, whether of a human or an animal (e.g. in veterinary applications), in which some desired therapeutic effect is achieved, for example, the inhibition or delay of the progress of the mental disorder, and includes a reduction in the rate of progress, a halt in the rate of mental disorder, amelioration of the mental disorder or one or more symptoms thereof, cure or remission (whether partial or total) of the mental disorder, or preventing, delaying, abating or arresting one or more symptoms and/or signs of the mental disorder.

Treatment may include prophylactic treatment (i.e. prophylaxis) i.e. the individual being treated may not have or may not be diagnosed as having a mental disorder at the time of treatment. For example, an individual susceptible to or at risk of the occurrence or re-occurrence of mental disorder may be treated as described herein. Such treatment may prevent or delay the occurrence or re-occurrence of mental disorder in the individual or reduce its symptoms or severity after occurrence or re-occurrence. In some embodiments, the individual may have been previously identified as having increased susceptibility or risk of mental disorder compared to the general population or a method may comprise identifying an individual who has increased susceptibility or risk of mental disorder. Prophylactic or preventative treatment may be preferred in some embodiments.

Whilst an TDRP antagonist may be administered alone, it is preferable to present it as a pharmaceutical composition (e.g. formulation) which comprises the TDRP antagonist, together with one or more pharmaceutically acceptable carriers, adjuvants, excipients, diluents, fillers, buffers, stabilisers, preservatives, lubricants, or other materials well known to those skilled in the art and, optionally, other therapeutic or prophylactic agents. Such materials should be non-toxic and should not interfere with the efficacy of the active compound. The precise nature of the carrier or other material will depend on the route of administration, which may be by bolus, infusion, injection or any other suitable route, as discussed below. Suitable materials will be sterile and pyrogen-free, with a suitable isotonicity and stability. Examples include sterile saline (e.g. 0.9% NaCl), water, dextrose, glycerol, ethanol or the like or combinations thereof. The composition may further contain auxiliary substances such as wetting agents, emulsifying agents, pH buffering agents or the like.

Methods of the invention may therefore comprise the step of formulating a TDRP antagonist as described herein with a pharmaceutically acceptable carrier, adjuvant or excipient. In some embodiments, the TDRP antagonist may be the only active ingredient in the pharmaceutical composition.

The term "pharmaceutically acceptable" as used herein pertains to compounds, materials, compositions, and/or dosage forms which are, within the scope of sound medical judgement, suitable for use in contact with the tissues of a subject (e.g., human) without excessive toxicity, irritation, allergic response, or other problem or complication, commensurate with a reasonable benefit/risk ratio. Each carrier, excipient, etc. must also be "acceptable" in the sense of being compatible with the other ingredients of the formulation. The precise nature of the carrier or other material will depend on the route of administration, which may be any non-oral route, for example by injection, e.g. cutaneous, subcutaneous, or intravenous.

The TDRP antagonist may be administered to a subject by any convenient route of administration, whether systemically/peripherally, including but not limited to parenteral, for example, by injection, including subcutaneous, intradermal, intramuscular, intravenous, intraarterial, intracardiac, intrathecal, intraspinal, intracapsular, subcapsular, intraorbital, intraperitoneal, intratracheal, subcuticular, intraarticular, subarachnoid, and intrasternal, preferably subcutaneous; by implant of a depot, for example, intradermally, subcutaneously or intramuscularly. Preferably, the TDRP antagonist is administered intravenously (IV), intramuscularly (IM) or intradermally (ID). The TDRP antagonist may be administered as a depot injection, for example an intradermal depot.

For intravenous, cutaneous or subcutaneous injection, or injection at the site of affliction, the TDRP antagonist will be in the form of a parenterally acceptable aqueous solution which is pyrogen-free and has suitable pH, isotonicity and stability. Those of relevant skill in the art are well able to prepare suitable solutions using, for example, isotonic vehicles such as Sodium Chloride Injection, Ringer's Injection, or Lactated Ringer's Injection. Preservatives, stabilisers, buffers, antioxidants and/or other additives including buffers such as phosphate, citrate and other organic acids; antioxidants, such as ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens, such as methyl or propyl paraben; catechol; resorcinol; cyclohexanol; 3'-pentanol; and m-cresol); low molecular weight polypeptides; proteins, such as serum albumin, gelatin or immunoglobulins; hydrophilic polymers, such as polyvinylpyrrolidone; amino acids, such as glycine, glutamine, asparagines, histidine, arginine, or lysine; monosaccharides, disaccharides and other carbohydrates including glucose, mannose or dextrins; chelating agents, such as EDTA; sugars, such as sucrose, mannitol, trehalose or sorbitol; salt-forming counter-ions, such as sodium; metal complexes (e.g. Zn-protein complexes); and/or non-ionic surfactants, such as TWEEN™, PLURONICS™ or polyethylene glycol (PEG) may be included, as required. Suitable carriers, excipients, etc. can be found in standard pharmaceutical texts, for example, Remington's Pharmaceutical Sciences, 18th edition, Mack Publishing Company, Easton, Pa., 1990.

The pharmaceutical compositions and formulations may conveniently be presented in unit dosage form and may be prepared by any methods well known in the art of pharmacy. Such methods include the step of bringing into association the TDRP antagonist with the carrier which constitutes one or more accessory ingredients. In general, the compositions are prepared by uniformly and intimately bringing into association the active compound with liquid carriers. Formulations may for example be in the form of liquids or solutions.

The TDRP antagonist may be administered as described herein in a therapeutically-effective amount. A "therapeutically-effective amount" is the amount of an active compound, or a combination, material, composition or dosage form comprising an active compound, which is effective for producing some desired therapeutic effect, commensurate with a reasonable benefit/risk ratio. The appropriate dosage of an active compound may vary from individual to individual. Determining the optimal dosage will generally involve the balancing of the level of therapeutic benefit against any risk or deleterious side effects of the administration. The selected dosage level will depend on a variety of factors including, but not limited to, the route of administration, the time of administration, the rate of excretion of the active compound, other drugs, compounds, and/or materials used in combination, and the age, sex, weight, condition, general health, and prior medical history of the individual. The amount of active compounds and route of administration will ultimately be at the discretion of the physician, although generally the dosage will be to achieve therapeutic plasma concentrations of the active compound without causing substantial harmful or deleterious side-effects.

In general, a suitable dose of the TDRP antagonist is in the range of about 100 μg to about 400 mg per kilogram body weight of the subject per day, preferably 200 μg to about 200 mg per kilogram body weight of the subject per day, for example 5-10 mg/kg/day. Where the active compound is a salt, an ester, prodrug, or the like, the amount administered is calculated on the basis of the parent compound and so the actual weight to be used is increased proportionately.

The pharmaceutical compositions comprising the active compounds may be formulated in a dosage unit formulation that is appropriate for the intended route of administration.

Administration in vivo can be effected in one dose, continuously or intermittently (e.g., in divided doses at appropriate intervals).

Methods of determining the most effective means and dosage of administration are well known in the art and will vary with the formulation used for therapy, the purpose of the therapy, the target cell being treated, and the subject being treated. Single or multiple administrations can be carried out with the dose level and pattern being selected by the physician.

Multiple doses of the TDRP antagonist may be administered, for example 2, 3, 4, 5 or more than 5 doses may be administered. The administration of the TDRP antagonist may continue for sustained periods of time. For example treatment with the TDRP antagonist may be continued for at least 1 week, at least 2 weeks, at least 3 weeks, at least 1 month or at least 2 months. Treatment with the TDRP antagonist may be continued for as long as is necessary to reduce mental disorder symptoms or achieve complete remission.

The TDRP antagonist may be administered alone or in combination with other treatments, either simultaneously or sequentially dependent upon the individual circumstances. For example, a TDRP antagonist may be administered in combination with one or more additional active compounds, for example immunomodulatory agents, such as immuno-suppressants, anti-psychotic drugs or other treatments.

In other embodiments, TDRP may be useful in screening for compounds with therapeutic activity against a mental disorder, for example anxiolytic activity. Compounds identified by the screen may be useful in the development of therapeutics for the treatment of mental disorders.

A method of screening for a compound with therapeutic, for example anxiolytic, activity may comprise contacting a test compound with isolated TDRP and determining the binding of the test compound to isolated TDRP and/or the neutralisation of the isolated TDRP by the test compound, said binding and/or neutralisation being indicative that the test compound has therapeutic activity against a mental disorder.

In other embodiments, a method of screening for a compound with therapeutic activity against a mental disorder, for example anxiolytic activity, may comprise;
  determining the effect of a test compound on the expression, level, amount or concentration of TDRP in a non-human mammal,
  a decrease in the expression, level, amount or concentration of TDRP being indicative that the compound has anxiolytic activity.

A test compound identified as having anxiolytic activity may be useful in the development of therapeutics for mental disorders.

Test compounds which may be screened using the methods described herein may be natural or synthetic chemical compounds used in drug screening programmes. Suitable compounds include TDRP antagonists and variants or derivatives thereof.

A test compound identified using one or more initial screens as having ability to bind or neutralise TDRP may be assessed further using one or more secondary screens. A secondary screen may involve testing for a biological function or activity in vitro and/or in vivo, e.g. in an animal model. For example, the ability of a test compound to reduce anxiety-related behaviour in a rodent model may be determined.

Following identification of a test compound which binds or neutralises TDRP, the compound may be isolated and/or purified or alternatively it may be synthesised using conventional techniques of chemical synthesis. The compound may be modified to optimise its pharmaceutical properties. This may be done using modelling techniques which are well-known in the art. Furthermore, it may be manufactured and/or used in preparation, i.e. manufacture or formulation, of a composition. This may be useful as a TDRP antagonist in the development of therapies for the treatment of mental disorders.

The data herein also shows that TDRP expression is upregulated during T cell activation. TDRP may therefore be useful a biomarker for T cell activation. A method of determining the activation of T cells in a sample may comprise;
  determining the expression of TDRP in the T cells in the sample.

Increased expression of TDRP in the T cells relative to controls may be indicative that the T cells are activated.

The sample may be a sample of T cells, for example $CD4^+$ T cells or $CD8^+$ T cells.

In some embodiments, the expression of TDRP in a sample of T cells obtained from an individual may be determined. Increased expression of TDRP in the sample of T cells relative to non-activated or resting T cells may be indicative of the presence of activated T cells in the sample from the individual.

In other embodiments, the amount or proportion of T cells in a sample of T cells that express high levels of TDRP may be determined. A high level of TDRP expression may be a level of TDRP expression that is exceeded by no more than 20% of the T cells in a resting or non-activated T cell population. An increased amount or proportion of T cells in the sample that express high levels of TDRP may be indicative that the T cells in the sample are activated.

The expression of TDRP may be determined using standard techniques. In some embodiments, the expression of TDRP may be determined at the protein level using immunological techniques, for example by contacting the sample with an anti-TDRP antibody. In other embodiments, the expression of TDRP may be determined at the mRNA level using Northern blotting or RT-qPCT techniques.

The determination of T cell activation using TDRP as described herein may be useful for example in assessing the level of immune system activation in the individual, for example to diagnose a disease condition.

Other aspects and embodiments of the invention provide the aspects and embodiments described above with the term "comprising" replaced by the term "consisting of" and the aspects and embodiments described above with the term "comprising" replaced by the term "consisting essentially of".

It is to be understood that the application discloses all combinations of any of the above aspects and embodiments described above with each other, unless the context demands otherwise. Similarly, the application discloses all combinations of the preferred and/or optional features either singly or together with any of the other aspects, unless the context demands otherwise.

Modifications of the above embodiments, further embodiments and modifications thereof will be apparent to the skilled person on reading this disclosure, and as such, these are within the scope of the present invention.

All documents and sequence database entries mentioned in this specification are incorporated herein by reference in their entirety for all purposes.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Experimental

Materials and Methods

Animals and Husbandry

Mice were housed in groups of 6 per cage under specific-pathogen-free conditions and with free access to food and water. Mice were housed for at least 7 days prior to testing. Wild type C57BL/6 mice purchased from Charles River. All experiments were performed during the light phase of the light-dark cycle and no more than 2 tests per day were performed. All tests were conducted under license from the Home Office and according to the UK Animals (Scientific Procedures) Act, 1986.

To monitory the transgenic colony, genomic DNA were extracted from ear clips by using REDExtract N-AMP-XNAT kit (Sigma, UK) and analysed by PCR with the following specific primers for AnxA1$^{tg}$: forward primer 5'-GTATGGAATCTCTCTTTGCCAAGC-3'; reverse primer is 5'-ACHGATATGCACATCAGGAGGG-3' (Thermo Scientific, UK). The parameters of the PCR reactions are: initial denaturation at 94° C. for 3 min followed by 30 cycles of denaturation at 94° C. for 45 sec, annealing at 60° C. for 45 sec and extension time at 72° C. for 15 sec, and afterwards a final extension step at 72° C. for 7 min.

Flow Cytometric Analysis

Thymocytes and lymphocytes were stained in 100 µl of FACS buffer (phosphate-buffered saline containing 5% fetal calf serum and 0.02% of NaN$_2$). The antibodies used were anti-CD3 phycoerythrin (clone 145-2C11), anti-CD4 fluorescein isothiocyanate (clone GK 1.5), anti-CD8 Cy5 (clone 53-6.7) (all from eBioscience, San Diego, CA, USA). Cells were labelled with the appropriate concentration of conjugated antibodies for 1 h at 4° C. as previously described. After labelling, cells were washed and analyzed using FACScalibur flow cytometer. Results were analyzed using the FlowJo™ software (Tree Star, Ashland, OR, USA, Oregon Corporation).

T Cell Activation Assay

Lymph node T cells ($1 \times 10^5$ cells/200 µl) were incubated with medium alone or stimulated by plate-bound anti-CD3 and anti-CD28 for 24 hours in 96-well plates. For CD25 and CD69 upregulation, lymph node T cells were stimulated with plate-bound anti-CD3 and anti-CD28 as indicated in the figure. After 16 hours, the cells were stained with PE-conjugated anti-CD69 (clone H1.2F3) and FITC-conjugated anti-CD25 (clone PC61.5) diluted in FACS buffer (PBS containing 1% FCS and 0.02% NaN$_2$). Intact cells were gated by using forward and side scatter and analyzed with the FlowJo™ software (Tree Star, Ashland, OR, USA, Oregon Corporation). IL-2 production was measured after 24 or 48 hrs of stimulation using a standard ELISA kit and according to the manufacturer's instructions (eBioscience).

Intracellular Staining and Cytometric Bead Assay

Th cell phenotype was studied by intracellular staining. Lymphocytes were isolated from MOG$_{35-55}$ immunized mice from peripheral lymphoid organs and spinal cord. Lymphocytes ($10 \times 10^6$ cells/ml) from lymph nodes and spleen were cultured for 72 hours with either medium alone (CTRL) or with anti-CD3 and anti-CD28 antibodies (1 µg/ml; plate bound) or with the specific antigen MOG$_{35-55}$ (100 µg/ml). At third day, the cells were pelleted and the supernatants stored at −20° C. Subsequently, the cells were rechallenged with concanavalin A (ConA, 5 µg/ml; Sigma) in presence of protein transport inhibitor Brefeldin A (1:1000; eBioscience) for 4 hours. Mononuclear cells isolated from the spinal cords instead were directly triggered with ConA and Brefeldin A after collection.

Cells were pelleted and then stained for CD4 (1:500) for half an hour and fixed with 1% PFA for 10 minutes. Thereafter, cells were permeabilized and stained for 30 min in permeabilization buffer (composed by 0.1% saponin and 009% sodium azide in PBS, eBioscience) containing conjugated antibodies for cytokines (dil: 1:250) such as IFNγ, IL-17, GM-CSF and IL-10 (See Table 6 for details). Finally, cells were washed and suspended in FACS buffer for flow cytometer analysis.

Cytometric Bead Array

Cytokine production was measured by bead-based analytic assay in flow cytometry. We used a Mouse Th1/Th2 10plex and custom-designed Mouse Th1/Th2/Th17/Th22 13plex kits (eBioscience). The former contains antibody-bounded beads for GM-CSF, IFNγ, IL-1α, IL-2, IL-4, IL-5 IL-6, IL-10, IL-17 and TNFα, while the latter contains antibody-bounded beads for IFNγ, IL-1α, IL-2, IL-4, IL-5 IL-6, IL-10, IL-13, IL-17, IL-21, IL-22, 11-27 and TNFα and it was supplemented with antibody-bounded beads for GM-SCF and IL-23. Each sample (25 µl of cell culture supernatant) was incubated with 50 µl bead mixture and 50 µl mix of antibodies conjugated with biotin for 2 h. After two washes, streptavidin PE conjugated antibodies was added (FIG. 2.11) and samples were let rocking for 1 hour in dark. Finally, samples were washed and stored overnight at 4° C. Standards diluted serially for 7 times were prepared and processed at the same time. Table 2.3. shows the parameters which were used for the analysis at BD LSR Fortessa.

Adoptive Transfer

Purified CD4$^+$ T cells were obtained from male wild type or AnxA1tg mice (6 weeks old) by negative selection following the manufacturer's instructions (Dynabeads Untouched Mouse CD3 Cells and Dynabeads Untouched Mouse CD4 Cells; Invitrogen, Invitrogen Life Technologies Ltd, Paisley, UK). Purity was tested by fluorescence-activated cell sorter and was >98%. Blood from the same animals was collected by intracardiac puncture performed under anesthesia. Plasma was obtained from the clotted blood by centrifugation (8000 rpm, 5 minutes) and stored at 4° C. till the time of the injection. Freshly isolated plasma and cells resuspended in phosphate-buffered saline (2×106/ 300 □l) were transferred into recipient male C57BL/6 mice (6 weeks old) by intraperitoneal injection.

Histology

Intact spinal cords were first fixed in 4% paraformaldehyde for 72 h and then incubated with decalcifying solution containing EDTA (0.1 mM in PBS) for 14 days prior to paraffin embedding. Tissues sections (5 μm) were deparaffinized with xylene and stained with haematoxylin and eosin (H&E) by our in-house histology facility. Histological evaluation was performed on paraffin-embedded sections sampled at various time points depending on disease severity. In all cases, a minimum of three sections per animal was evaluated. Phase-contrast digital images were taken using the Image Image-Pro (Media Cybernetics, Rockville, MD, USA) analysis software package.

$MOG_{35-55}$-Induced Experimental Autoimmune Encephalomyelitis

Male C57BL/6 mice received an intradermal injection of $MOG_{35-55}$ (300 □g) emulsified in Complete Freund's adjuvant (CFA) and two doses of pertussis toxin (PTX) at day zero and day two as previously reported. The severity of the disease was scored on a scale of 0 to 6 with 0=no neurological signs, 1=tail weakness, 2=tail paralysis, 3=loss of righting reflex (the mouse can no longer right themselves after being laid on their back), 4=hind leg paralysis, 5=quadriplegia and 6=death.

Leukocytes Isolation from Central Nervous System

Vertebral columns were dissected from the lumbar to the cervical region and washed several times in PBS to remove blood trace. Spinal cords were extracted by hydro pressure in the spinal canal by using a 2 ml syringe and 19-gauge needle. Subsequently, tissues were torn apart in sterile PBS by mechanical pressure through a 70 μm mesh cell strainer (Falcon). Mononuclear cells and lymphocytes were isolated by density gradient centrifugation in Percoll (GE Healthcare). In detail, cells were pelleted at 400×g for 5 min and suspended in a 30% Percoll solution. The 30% Percoll solution was carefully layered onto a 70% Percoll solution in a ratio 1:2 and centrifuged at 500×g for 30 min. In this density gradient mononuclear cells sediment at the interface between 30% and 70% Percoll layers. About 2-3 ml of interface solution was collected only after the fatty layer at the top of the centrifuge tube was carefully removed. The purified mononuclear cells were washed twice in RPMI supplemented with 100 U/ml of penicillin and streptomycin and 10% of FCS (Invitrogen).

Pristane-Induced Lupus

Wild-type or AnxA1tg male mice received a single 0.5 ml i.p. injection of sterile pristane (Sigma-Aldrich, St Louis, MO, USA). Weight was recorded every other day or every 3 days for over 5 weeks. In some experiments mice were culled after 2 weeks and the peritoneal lavage collected with PBS/EDTA to measure the levels of inflammatory cytokines and to analyze the phenotype of the recruited activated T cells as previously described.

Digging and Marble-Burying Tests

Marble-burying and digging tests were carried out as described previously with some modifications. Briefly, mice were individually placed in a clear plastic box (14 cm×10 cm×11 cm) filled with approximately 5-cm-deep wood chip bedding lightly pressed to give a flat surface. The same bedding substrate was used for all the mice and flattened after each test. Fifteen glass marbles were placed on the surface in five rows of three marbles each. The latency to start digging, the number of digging bouts and the number of buried marbles (to ⅔ their depth) were recorded during the 15-min test. Two trials were performed, the second trial taking place 24 h after the first trial.

Climbing Activity Test

The climbing test is used to assess vertical activity and exploratory behaviour. The test was performed as previously described but with some modifications. Briefly, mice were placed, one at a time, on a thin layer of fresh wood chip bedding on a laboratory bench and covered with a cylindrical climbing mesh (60 cm630 cm base diameter). They were each observed and recorded for 5 minutes. The number of climbing events and total duration of climbing activity was assessed. The criterion for climbing was for a mouse to have all 4 feet on the wire mesh while a climb terminated as soon as one foot touched the bench. This test was conducted in the late afternoon, when mice are known to be more active.

Light-Dark Shuttle Box

In this test exploratory activity reflects the combination of hazard and risk avoidance [44]. The apparatus consisted of a 45 cm620 cm621 cm box, divided into two distinct compartments: one third (15 cm long) painted black, with a black lid on top, the remaining two thirds painted white and uncovered. A 2.5 cm62.5 cm opening joined the two compartments. One side of the bright box was transparent to enable behavioural assessment and the averseness of this compartment was increased by additional illumination supplied by a 50 W lamp placed 45 cm above the centre of the box floor. The test was performed in accordance with a previous published protocol. Each mouse was placed in the bright compartment, facing away from the opening and allowed to explore the box for 5 minutes. Dependent variables included the time spent in the light area, latency to cross to the dark area (all four paws in) and the total number of transitions between compartments. The apparatus was cleaned after each trial.

Open Field Activity Test

The open filed test was performed as described previously with some modifications. The open field consisted of a white PVC arena (50 cm×30 cm) divided into 10 cm×10 cm squares. Mice were brought into the experimental room 15 min before testing. Each mouse was placed in one of the corner squares facing the wall, observed and recorded for 5 min. The total number of squares crossed, latency to the first rear and the total number of rears were recorded. After each test, the arena was cleaned with water to attenuate and homogenize olfactory traces. Two trials were performed, the second trial taking place 24 h after completion of the first trial.

Microarray Analysis

Total RNA was extracted from brains of wild-type and AnxA1tg mice using RNeasy Microarray Tissue Mini Kit (Qiagen, West Sussex, UK) while for the purified CD4+ T cells we used RNeasy Mini Kit from the same manufacturer. Total RNA was hybridized to Affymetrix Mouse Gene 1.0 ST array chips at UCL Genomics (London, UK) with standard Affymetrix protocols, using GeneChip Fluidics Station 450, and scanned using the Affymetrix GeneChip Scanner (Affymetrix, Santa Clara, CA, USA). Data were normalized by rma of the Bioconductor package, affy. Differentially expressed genes were identified by the Bioconductor package, limma, considering the false discovery rate (adjusted P-value 00.05). The gene and sample scoring system was made by canonical correspondence analysis. Canonical correspondence analysis is a variant of correspondence analysis, where the main data are linearly regressed onto explanatory variables (environmental variables), and subsequently the regressed data are analyzed by correspondence analysis. In this study, we regressed the whole data set onto an explanatory variable, which was defined as the difference between 'average' wild-type and 'average' AnxA1$^{tg}$. Detailed methodology is described elsewhere. Signaling pathway impact analysis was performed using the Bioconductor package, SPIA, by comparing wild-type and AnxA1$^{tg}$.

Real-Time Polymerase Chain Reaction

Total RNA was extracted from whole brains (n ¼ 6 for each mouse line) with RNeasy Microarray Tissue Mini Kit (Qiagen) according to the manufacturer's protocol and reverse transcribed using 2 mg oligo(dT)15 primer, 10 U AMV reverse transcriptase, 40 U RNase inhibitor (all from Promega Corporation, Madison, WI, USA) and 1.25 mM each dNTP (Bioline, London, UK) for 45 min at 42 1 C. Real-time polymerase chain reaction was carried out by using ABsolute™ QPCR ROX Mix (Thermo Scientific, Epsom, UK) and fluorescent QuantiTect primers. Cycling conditions were set according to the manufacturer's instructions. Sequence-specific fluores-cent signal was detected by 7900HT Fast Real-Time PCR System (Applied Biosystems, Warrington, Cheshire, UK). mRNA data were normalized relative to glyceraldehyde 3-phosphate dehydrogenase and then used to calculate expression levels. We used the comparative Ct method to measure the gene transcription in samples. The results are expressed as relative units based on calculation of 2 □DDCt, which gives the relative amount of gene normalized to endogenous control (glyceraldehyde 3-phosphate dehydro-genase) and to the sample with the lowest expression set as 1. Total RNA was also isolated from PBMCs of OCD subjects and healthy controls according to the method of Chomczynski and Sacchi (1987). RT-PCR reactions were performed using the RevertAid H Minus First Strand cDNA Synthesis Kit (Thermo Scientific, Waltham, MA, USA). The relative abundance was assessed by RT-qPCR using iQ SYBR Green Supermix (Hercules, CA, USA) on a DNA Engine Opticon 2 Continuous Fluorescence Detection System (MJ Research, Waltham, MA, USA). To provide precise quantification of the initial target in each PCR reaction, the amplification plot was examined and the point of early log phase of product accumulation defined by assigning a fluorescence threshold above background, defined as the threshold cycle number or Ct. Differences in threshold cycle number were used to quantify the relative amount of the PCR targets contained within each tube. After PCR, a dissociation curve (melting curve) was constructed in the range of 60 to 95° C. to evaluate the specificity of the amplification products. The relative expression of different amplicons was calculated by the delta-delta Ct (ΔΔCt) method and converted to relative expression ratio ($2^{-\Delta\Delta Ct}$) for statistical analysis. All human data were normalized to the endogenous reference genes β-ACTIN and GAPDH combined.

Western Blotting Analysis

Lymph node and splenic T cells or purified CD4+ T cells were stimulated as indicated in the figure. After incubation at 37° C., cells were lysed in ice-cold lysis buffer (1% NP-40, 20 mM Tris pH 7.5, 150 mM NaCl, 1 mM MgCl$_2$, 1 mM EGTA, 0.5 mM PMSF, 1 μM aprotinin, 1 μM leupeptin, 1 μM pepstatin, 50 mM NaF, 1 mM NaVO$_4$, 1 mM μ-glycerophosphate) while the supernatant was collected and stored at −20° C. To immunoprecipitate extracellular released Immuno-moodulin, 5 μl of rabbit polyclonal anti-2610019F03Rik antibody (Origene, USA) and 35 μl of protein A/G sepharose beads were added to 500 μl of culture supernatants obtained from 1×10$^7$/ml T cells stimulated with plate-bound anti-CD3/CD28 (0.5 μg/ml) for 24 or 48 hrs. Samples were incubated overnight at 4° C. under continuous rotation and then washed with PBS. Lysates and immunoprecipitates were denatured with hot 6× sample buffer and subjected to electrophoresis on SDS-12% poly-acrylamide gel (Novagen). After subsequent transfer onto PVDF membranes, these were incubated overnight with antibodies diluted in Tris-buffered saline solution containing Tween-20 (TTBS: 130 mM NaCl; 2.68 mM KCl; 19 mM Tris-HCl; 0.001% v/v Tween-20, pH 7.4) with 5% nonfat dry milk at 4° C. Immunoblotting and visualization of proteins by enhanced chemiluminescence (ECL; Amersham Biosciences, Piscataway, NJ, USA) were performed according to manufacturer's instructions.

Generation of T Cell-Specific AnxA1tg Mice

To generate the VACD2 Anx-A1 FLAG transgenic mice, murine Anx-A1 gene was extracted, amplified and tagged with the FLAG epitope. The gene was cloned in TOPO pcDNA3.1 vector for verification of its expression in vitro and finally subcloned in the VACD2 vector for T cell specific expression in the mouse. Finally, the VACD2 Anx-A1 FLAG construct was modified and purified for the pronuclear microinjection into the mouse genome.

Subjects

20 OCD outpatients of either gender and any age, treated and followed up at the OCD tertiary outpatient Clinic of the University Department of Psychiatry of Milan, Policlinico Hospital, were included in the study. Diagnoses were assessed by the administration of a semi-structured interview based on DSM-5 criteria (SCID 5 research version, RV). In case of psychiatric comorbidity, OCD had to be the primary disorder, causing the most significant distress and dysfunction and providing the primary motivation to seek treatment. Patients were excluded from the study if they had recent or current alcohol or substance abuse (last 3 months), as well as medical conditions including autoimmune diseases, due to their potential influence over gene expression. For the same reason, lifetime history of trauma (according to DSM-5), as well as the current presence of relevant psychological stress, were considered exclusion criteria. Clinical assessment included the collection of the following demographic and clinical variables: gender, age, age at onset, and current pharmacological treatment. In addition, illness severity was measured through the Yale-Brown Obsessive Compulsive Scale. Patients had maintained their pharmacological treatment stable for at least one month in order to be enrolled in the study. Control subjects (n=20) were volunteers matched for gender, age and ethnicity, with no psychiatric diagnosis as determined by the SCID 5 and no positive family history for major psychiatric disorders in the first-degree relatives (as assessed by the Family Interview for Genetic Studies). All subjects had given their written informed consent to participate to the study, which included the use of personal and clinical data as well as blood drawing for genotyping and methylation analysis. The study protocol had been previously approved by the local Ethics Committee.

Results

Generation and Phenotypic Characterization of T Cell Specific AnxA1$^{tg}$ Mice We generated T cell specific transgenic mice through pronuclear injection of VACD2 Anx-A1 FLAG construct in 129 FVB mice. Both the two founders and their litters showed no gross sign of disease. Following backcrossing onto C57BL/6 background and intercross to generate mice with the transgene on both alleles, we noticed that the female litters from one of the two transgenic founders presented an unusual high incidence (almost 80%) of maternal cannibalism. This was successfully controlled by administering perphenazine during pregnancy as it has been previously reported for other autoimmune prone and highly anxious mouse strains such as the DBA/2J[34]. Newborn pups from this line were raised by foster C57BL/6 mothers to avoid losing the colony. Despite these efforts, we had problems to maintain this colony and for this reason it was terminated. Analysis of the immune repertoire of AnxA1$^{tg}$ mice from the other founder showed no significant differences in lineage commitment towards CD4$^+$ or CD8$^+$ cells in all lymphoid organs. Conversely, the total cell count revealed a selective increase in the total cell number (by about 60%) in lymph nodes, but not spleen and thymus of AnxA1$^{tg}$ mice compared to control.

Increased T Cell Activation and Autoimmunity in AnxA1$^{tg}$ Mice

Figure 1B:
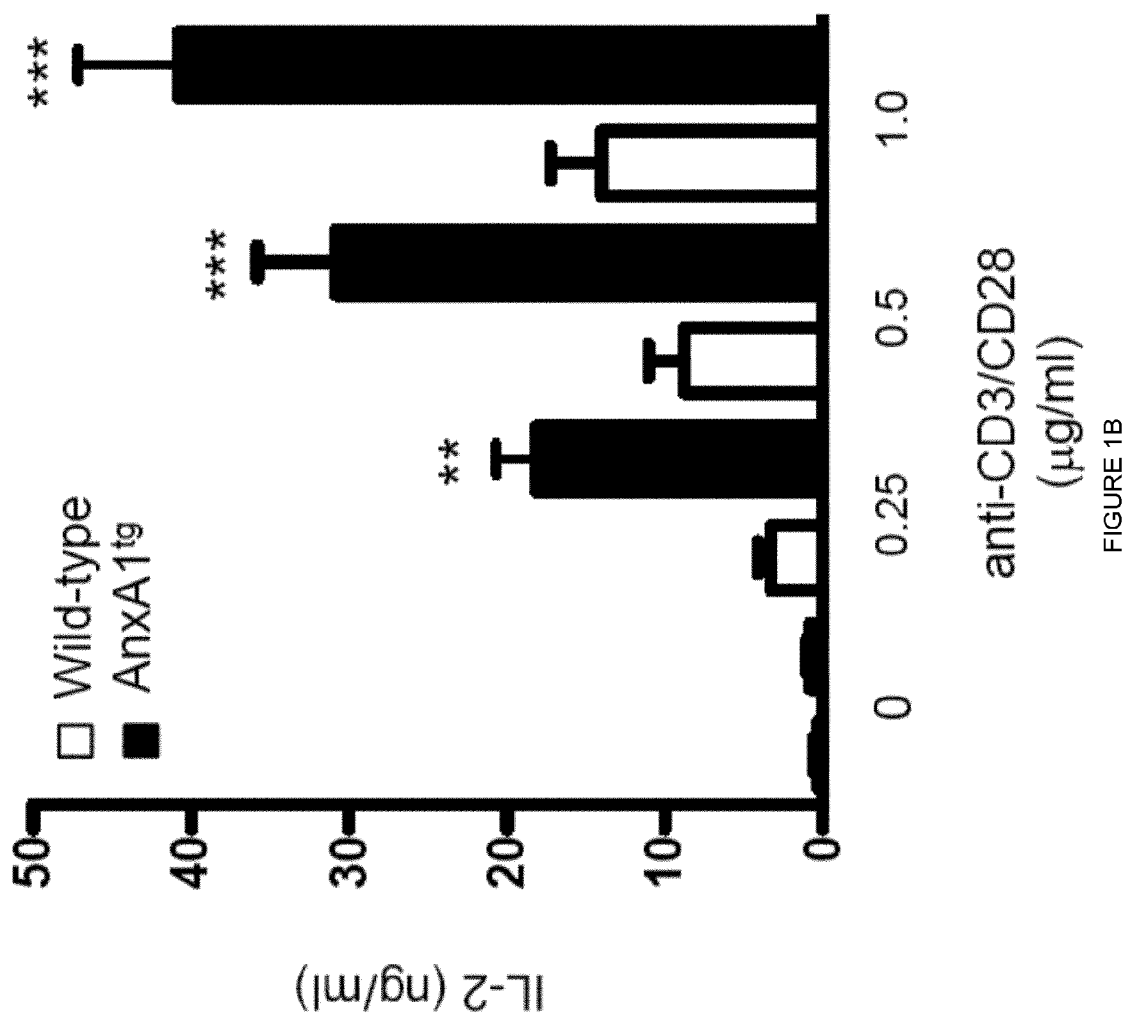
Figure 1C:
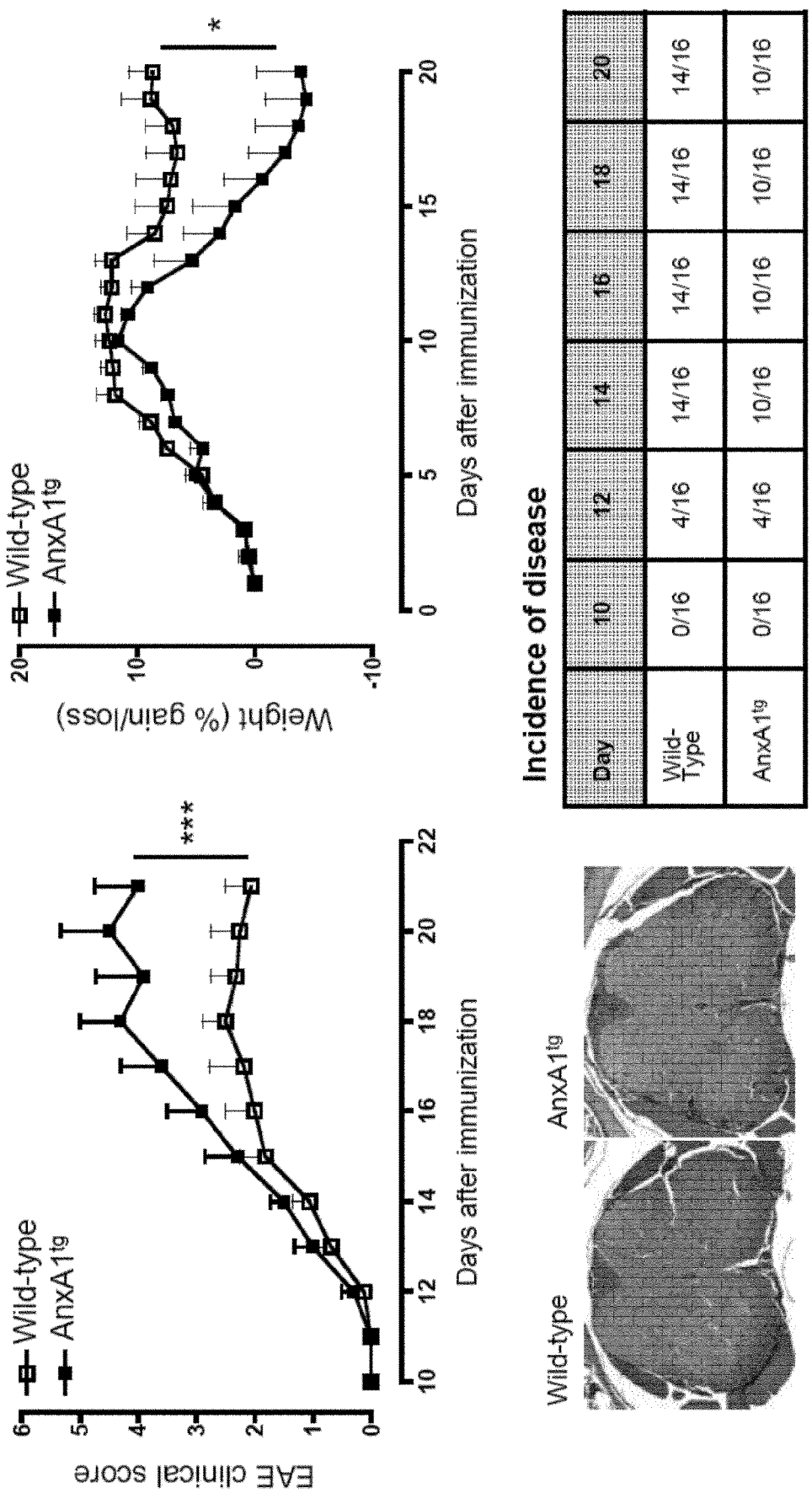
Figure 1D:
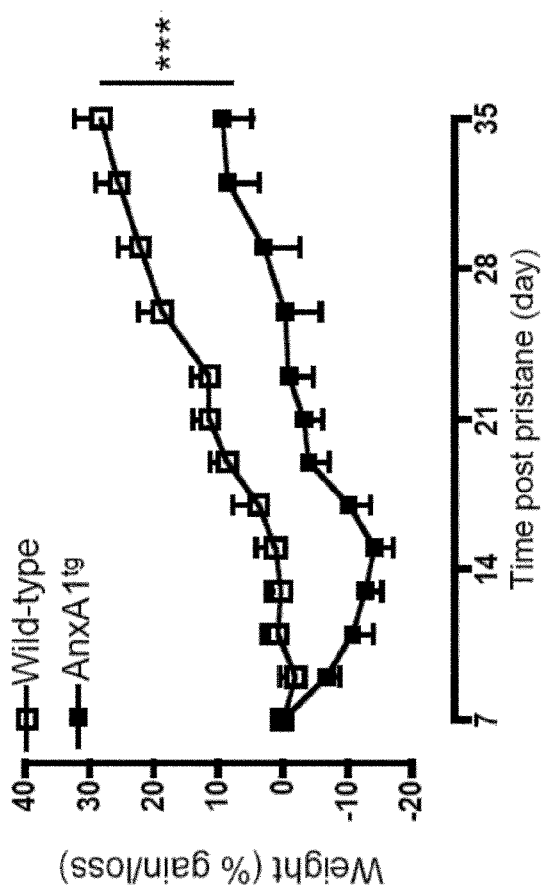
Figure 1D:
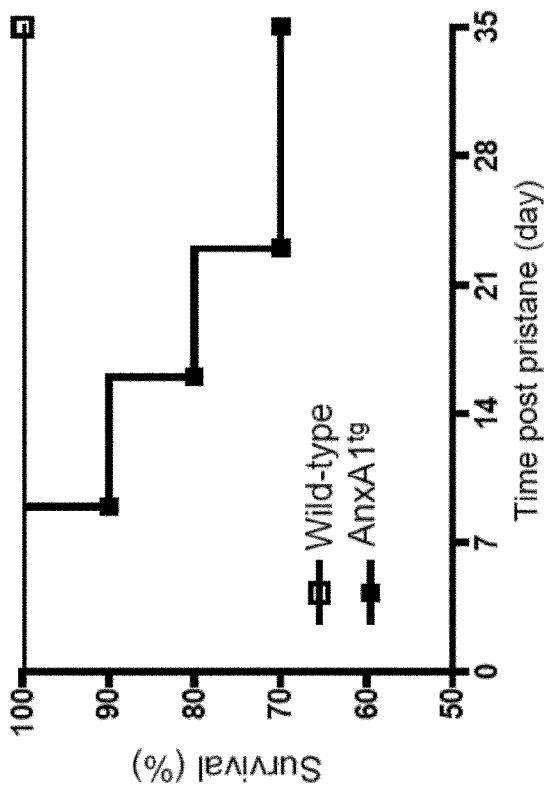

Consistent with our previous reports[22, 23, 25, 26], AnxA1$^{tg}$ T cells showed a clear pro-inflammatory phenotype as evidenced by lower threshold of CD25 and CD69 upregulation (FIG. 1A) and increased production of IL-2 following anti-CD3 plus CD28 stimulation (FIG. 1B). In vivo, AnxA1$^{tg}$ mice showed an exacerbated inflammatory response in the MOG$_{35-55}$-induced experimental autoimmune encephalomyelitis (EAE) (FIG. 10) as evidenced by the exacerbated severity of the clinical score and increased weight loss after the onset of the disease (day 12) and larger inflammatory infiltrate of the spinal cord in AnxA1$^{tg}$ mice compared to wild-type. No differences were observed in terms of disease incidence between control and AnxA1$^{tg}$ mice (Table in FIG. 1C). To expand and confirm these findings in another model of autoimmune inflammation, we subjected AnxA1$^{tg}$ mice to an experimental model of systemic lupus erythematosus[35]. As shown in FIG. 1D (right panel), injection of pristane to AnxA1$^{tg}$ mice provoked a significant weight loss over a period of 35 days while control mice gained about 30% of their initial weight over the same period. Consistent with these results, ~30% of AnxA1$^{tg}$ mice died during the 35-day treatment while control animals showed a 100% survival (Fig. D; left panel).

Selective Accumulation of Th1/Th17 Double Positive Cells in the Inflamed Tissue of AnxA1$^{tg}$ Mice To further examine the activation state of AnxA1$^{tg}$ T cells in the EAE mice, we investigated the effector phenotype of these cells at day 9 (onset of the disease) and day 16 (peak of the disease). This allowed us to distinguish the effects of AnxA1 overexpression during the priming phase occurring in the draining lymph nodes at day 9 or the differentiation phase occurring within the spinal cord at day 16[36]. Day 9 comparison of the draining lymph nodes of control and AnxA1$^{tg}$ mice showed a significant increase in the number of CD4$^+$ T cells (by about 85%) in the latter group, but no difference in the percentage of IL-17$^+$/IFN-γ$^+$ or IL-17$^+$/GM-CSF$^+$ double-positive or single-positive T cells. At day 16, the number of CD4+ T cells recovered from the spinal cord of was ~3-fold higher in AnxA1$^{tg}$ compared to control but in this case we observed an increase in IFN-γ$^+$/IL-17$^+$ or GM-CSF$^+$/IL-17$^+$ pathogenic[37] double-positive T cells in the former compared to the latter. Fate mapping reporter studies for Th17 cells in this model of autoimmune inflammation have shown that these double-positive cells represent a transition phase during the 'conversion' of IL-17 single-positive into IFN-γ or GM-CSF double-positive T cells at the site of inflammation[38]. Consistent with these findings, AnxA1$^{tg}$ mice show a higher percentage of IL-17$^+$ cells and a corresponded reduced percentage of IFN-γ (about 10% in AnxA1$^{tg}$ vs 18% in control) and GM-CSF (about 16% in AnxA1$^{tg}$ vs 20% in control) single-positive cells.

Increased Basal Anxiety-Like Behavior in AnxA1$^{tg}$ Mice

Figure 2A:
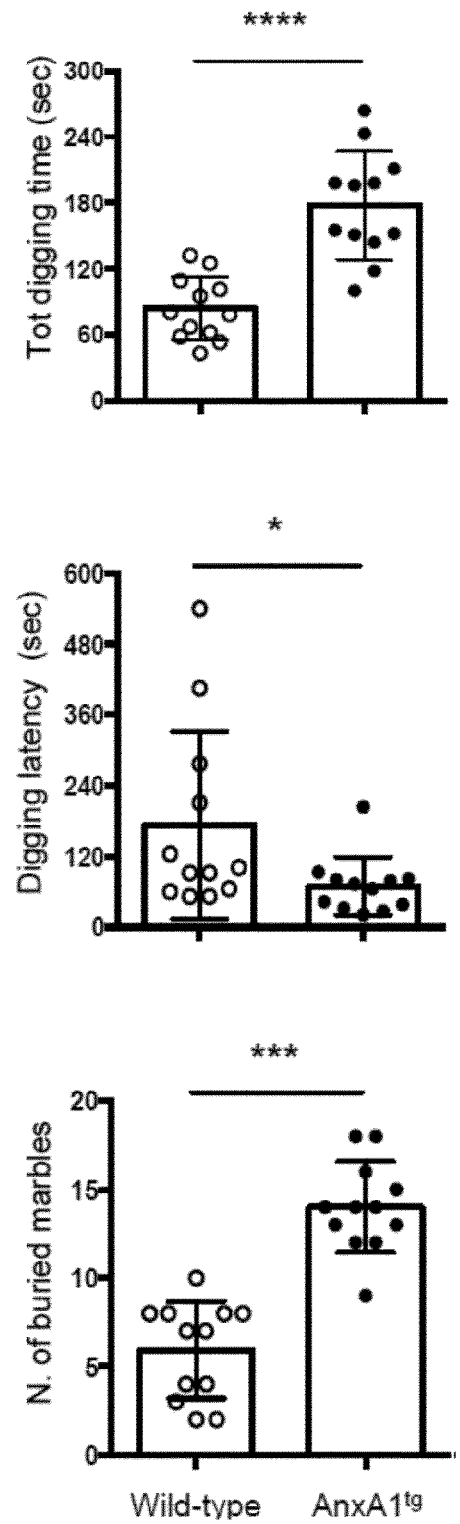
FIG. 2 shows increased signs of anxiety-like behavior in T cell-specific AnxA1tg mice. (2A) The bar graphs show the total number of buried marbles, total duration (seconds) of digging and the latency (seconds) to the first digging bout during a 10-minute trial. Values are expressed as means±SEM of two separated experiments with n=6 mice and representative of four different experiments involving 6 mice per group. (2B) The bar graphs show the total time (seconds) spent in the lit area, latency (seconds) to first cross to the dark chamber and total number of transition during a 5-minute trial. Values are expressed as means±SEM of two separated experiments with n=6 mice and representative of four different experiments involving 6 mice per group. (2C) The bar graphs show the number of climbing events and total time (seconds) spent on the climbing mesh during a 5-minute trial. Values are expressed as means±SEM of two separated experiments with n=6 mice and representative of four different experiments involving 6 mice per group. (2D) The bar graphs and images show total number of squares crossed, rears and centre crossings during a 5-minute session. Values are expressed as means±SEM of two separated experiments with n=6 mice and representative of four different experiments involving 6 mice per group. *p<0.05, p<0.01, *p<0.001, ****p<0.0001 indicate significant values compared with wild-type control mice (Mann-Whitney U-test).
Figure 2B:
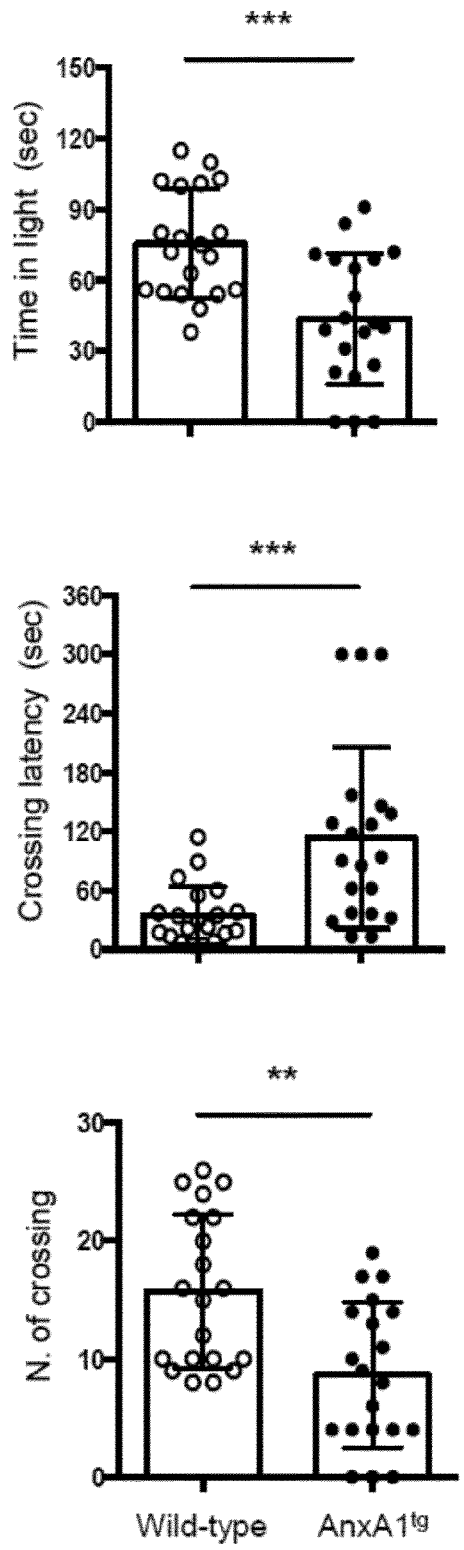
Figure 2C:
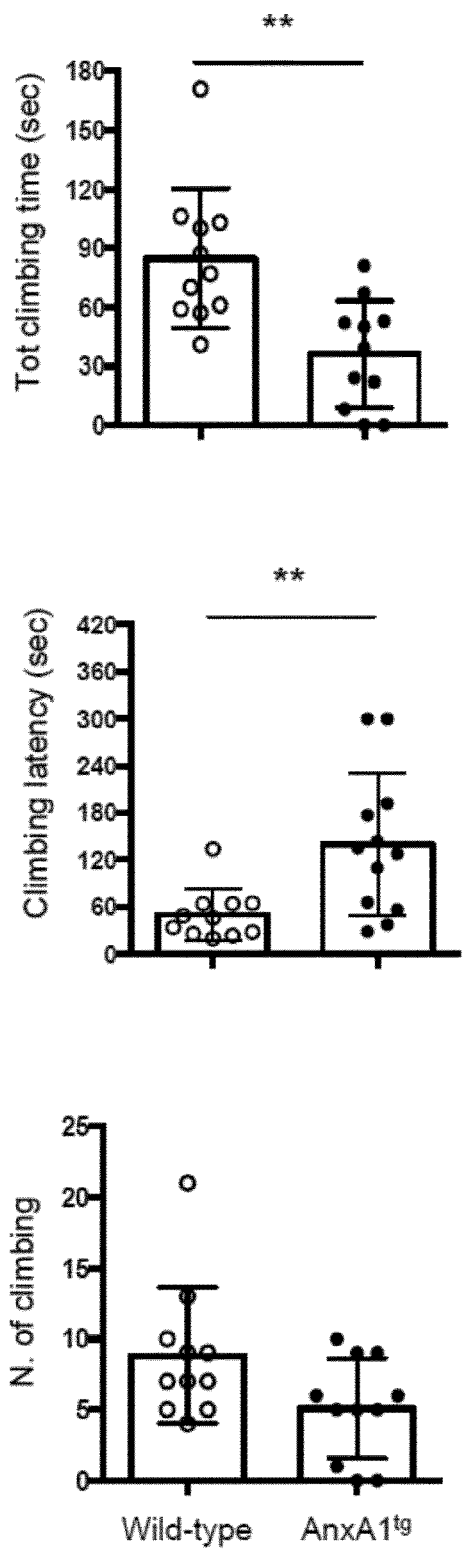
Figure 2D:
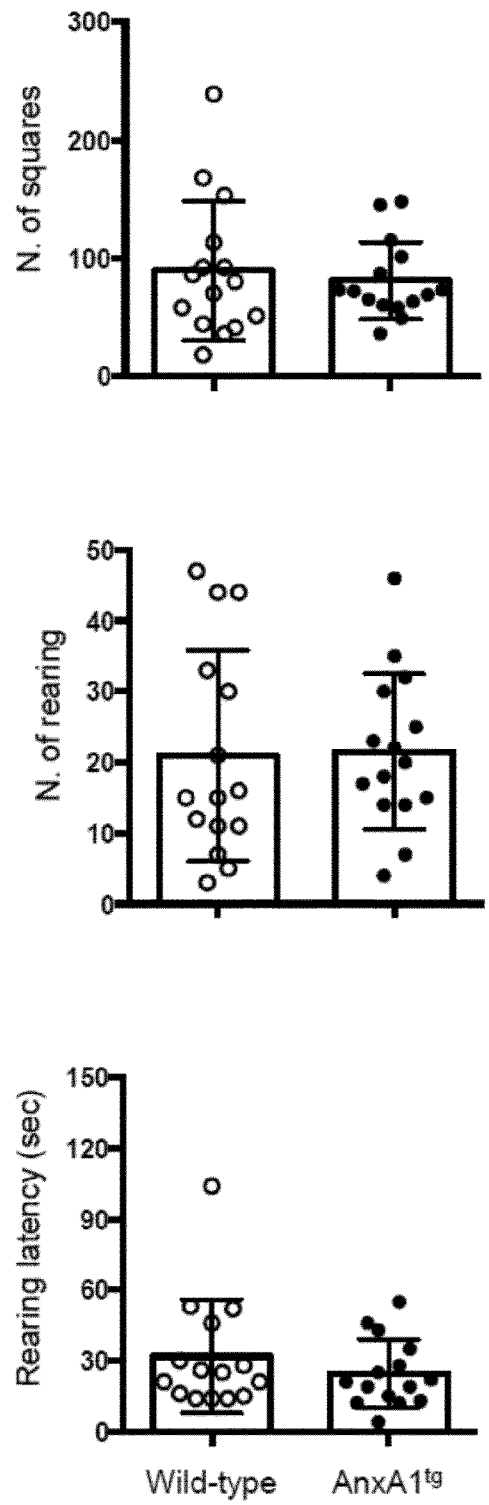

Direct observation of AnxA1$^{tg}$ mice in their cage revealed an altered behaviour typified by an increased tendency to compulsive digging (compare Movie 1, wild type mice and Movie 2, AnxA1$^{tg}$ mice). To thoroughly measure this heightened anxious behavior we used a battery of classical tests for anxiety behavior. The marble-burying test is used to measure digging[39] and when applied to AnxA1$^{tg}$ we quantified a significant increase in the number of buried marble by the mice, which spent approximately double the time on its activity (FIG. 2A). In the light and dark shuttle box test[40] AnxA1$^{tg}$ mice spent in the lit area than the wild type counterpart, with a marked attenuation of numbers of crossings between the two compartments (FIG. 2B). Significant behavioral differences were observed also in the climbing test[41]: AnxA1$^{tg}$ mice showed an increased latency to the first climb and a significant reduction in the time spent on this activity (FIG. 2C). All these changes were not secondary to a general impairment of locomotor activity as AnxA1$^{tg}$ mice showed no difference in the number of i) square crossed or ii) rearing as quantified in the open field test[42] when compared to wild-type animals (FIG. 2D).

Gene fingerprint of AnxA1$^{tg}$ whole brain reveals an increased expression of anxiety-related genes CD4$^+$ T cells exert a homeostatic control of anxiety-like behavior[43,44] through a number of mechanisms including direct influence on gene within the brain[45]. We queried if this was the case for AnxA1$^{tg}$ mice and performed a comparative analysis of gene expression profile of the whole brain using microarray analysis. The results showed significant differences in the level of expression of 15 genes of which 8 were unregulated and 7 downregulated in the whole brains of AnxA1$^{tg}$ mice in comparison to those of WT mice. Among these, several were associated with emotional disorders including alcoholism and anxiety such as erythroid differentiation regulator 1 (Erdr1)[46] and gamma-aminobutyric acid receptor subunit alpha-2 (Gabra2)[47]. RT-PCR analysis of these genes on a larger number of samples confirmed these results with a down regulation of Erdr1 by about 78% and an ~3-fold upregulation of Gabra 2. Thus, the transgenic T cells can exert a tonic regulation on a discrete set of genes in the brain, even in the absence of any experimental manipulation.

Adoptive Transfer of AnxA1$^{tg}$ CD4$^+$ T Cells in C57BL/6 Mice Increases their Anxiety-Like Behaviour To determine causality between overexpression of AnxA1 in CD4$^+$ T cells and the anxious phenotype, we generated chimeric mice in which either control C57BL/6 or AnxA1$^{tg}$ CD4$^+$ T cells were adoptively transferred into C57BL/6 hosts. Only mice receiving AnxA1$^{tg}$ CD4$^+$ T cells, but not those receiving control C57BL/6 CD4$^+$ T cells showed a time dependent increase in anxiety-like behavior. Most interestingly, early changes in behavior were measurable at week 1 after transfer (data not shown) but became significant at week 3 indicating that the continuous presence of these cells in circulation, or the constant release of a factor they might produce, could be responsible for the increase in anxiety.

To address this question, we compared gene expression profiles of purified CD4+ T cells by microarray. In resting conditions, no statistical differences were observed between AnxA1$^{tg}$ and control CD4+ T cells (data not shown). However, in anti-CD3 plus anti-CD28 stimulated cells, 8 genes were identified to be significantly modulated. Among those upregulated, AnxA1, interferon-inducible 203 and 2610019F03Rik (also called testis development related protein, Tdrp). We were intrigued by the last one as it encoded for a small protein of about 21 kDa (like most of the cytokines) that was secreted and present in circulation and therefore decided to investigate its function. As we identified this gene in T cells and hypothesized that would be responsible for the anxious behavioral phenotype of AnxA1$^{tg}$ mice, we named it Immuno-moodulin (Imood).

Figure 3A:
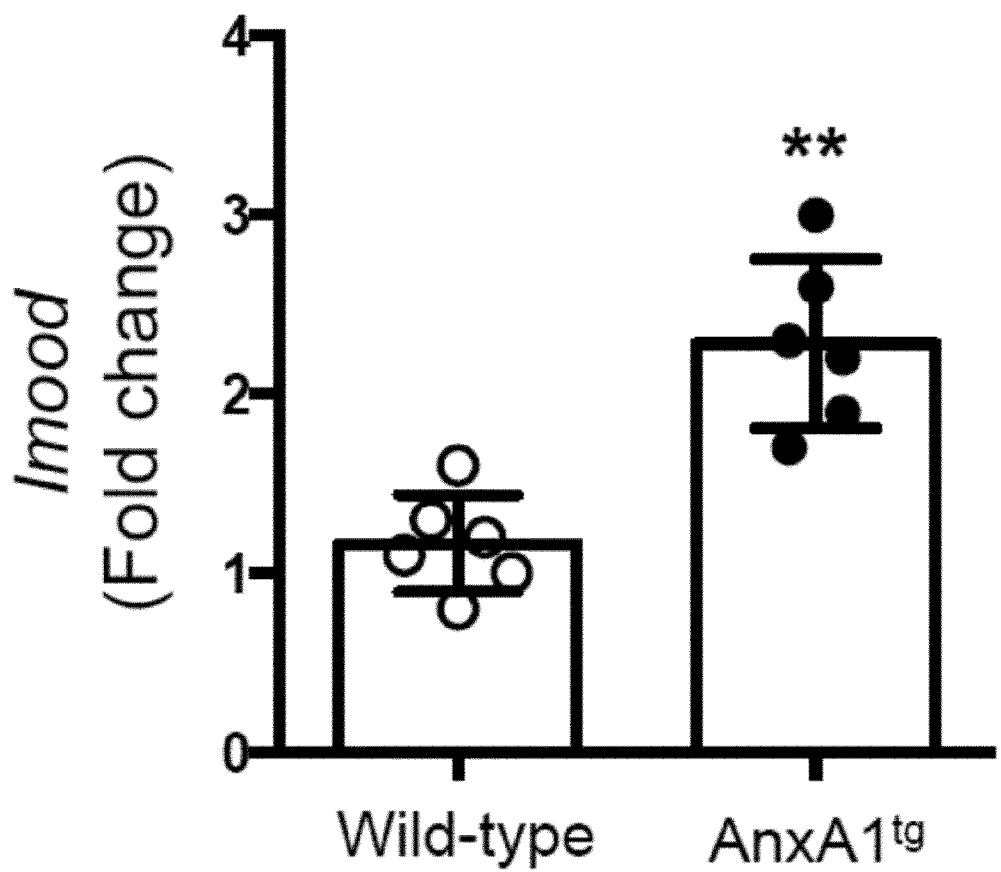
FIG. 3 shows Imood expression in AnxA1$^{tg}$ mice. (3A) RT-PCR of Imood expression in purified CD4$^+$ T cells from wild-type and AnxA1' mice. Values are expressed as means±SEM of a single experiments with n=6 mice. p<0.01 indicate significant values compared with wild-type control mice. (3B) FACS intracellular staining of T cells from wild-type or AnxA1$^{tg}$ mice with a polyclonal anti-Imood antibody or IgG control. The panels on the left show typical histogram obtained from a single mouse. The bar graph on the right show the Mean Fluorescence Intensity (MFI) values from n=6 mice. *p<0.01 indicate significant values compared with wild-type control mice. Data are representative of n=3 separate experiments with similar results. (3C) Western blotting of the whole cell lysates of indicated number of CD4$^+$ T cells from wild-type and AnxA1tg mice. Membranes were immunoblotted with a polyclonal anti-Imood antibody and recombinant Imood (r-Imood) was used as control. (3D) C57BL/6 mice were injected with PBS or r-Imood or denaturated r-Imood (d-Imood) (500 ng, i.p.) and tested at day 7 post injection. The bar graphs show the total time (seconds) spent in the lit area and total number of transition during a 5-minute trial. Values are expressed as means±SEM of two separated experiments with n=6 mice (C57BL/6) mice. **p<0.01 indicate significant values compared with PBS-injected control mice. §§ p<0.01; §§§ p<0.001 indicate significant values compared with d-Imood-injected control mice. (Mann-Whitney U-test).
Figure 3B:
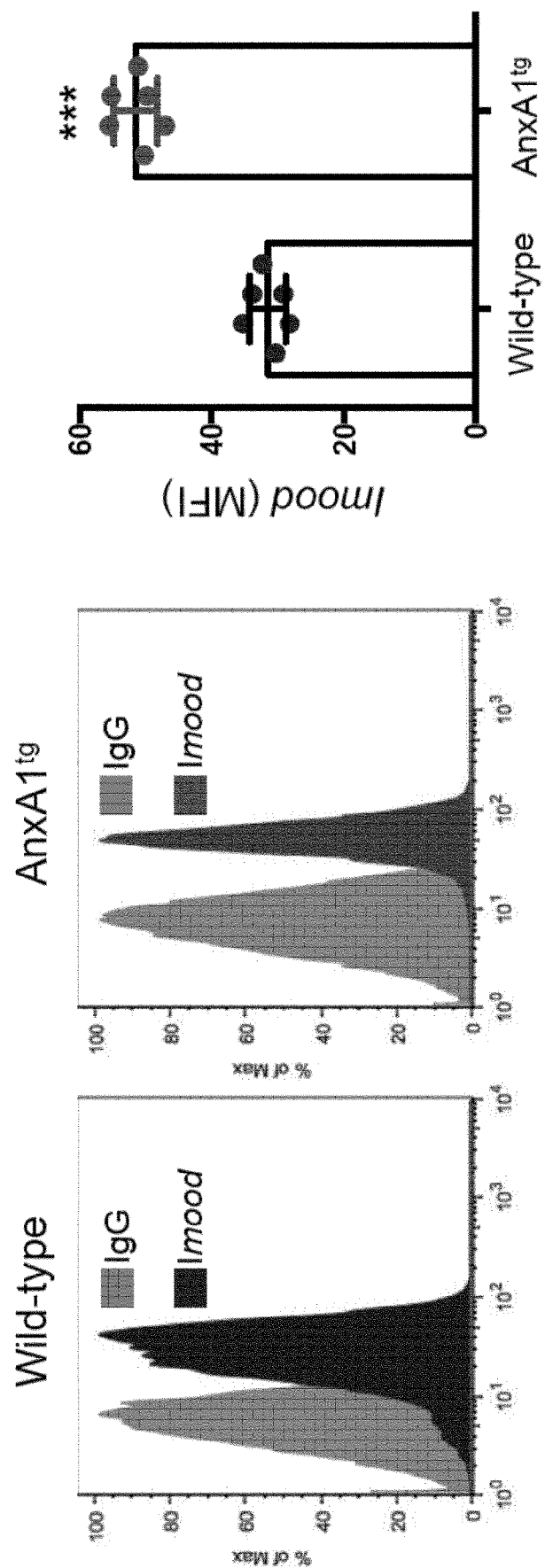

AnxA1$^{tg}$ CD4+ T Cells Express High Level of a New Anxiogenic Factor Named Immuno-Moodulin Next, we first validated microarray results using immunoblotting and FACS intracellular staining of CD4+ T cells using a commercially available polyclonal antibody against Imood. The results consistently showed a significant increase in the expression of both Imood mRNA and protein in AnxA1$^{tg}$ compared to wild-type (FIGS. 3A, B and C, respectively).

Figure 3C:
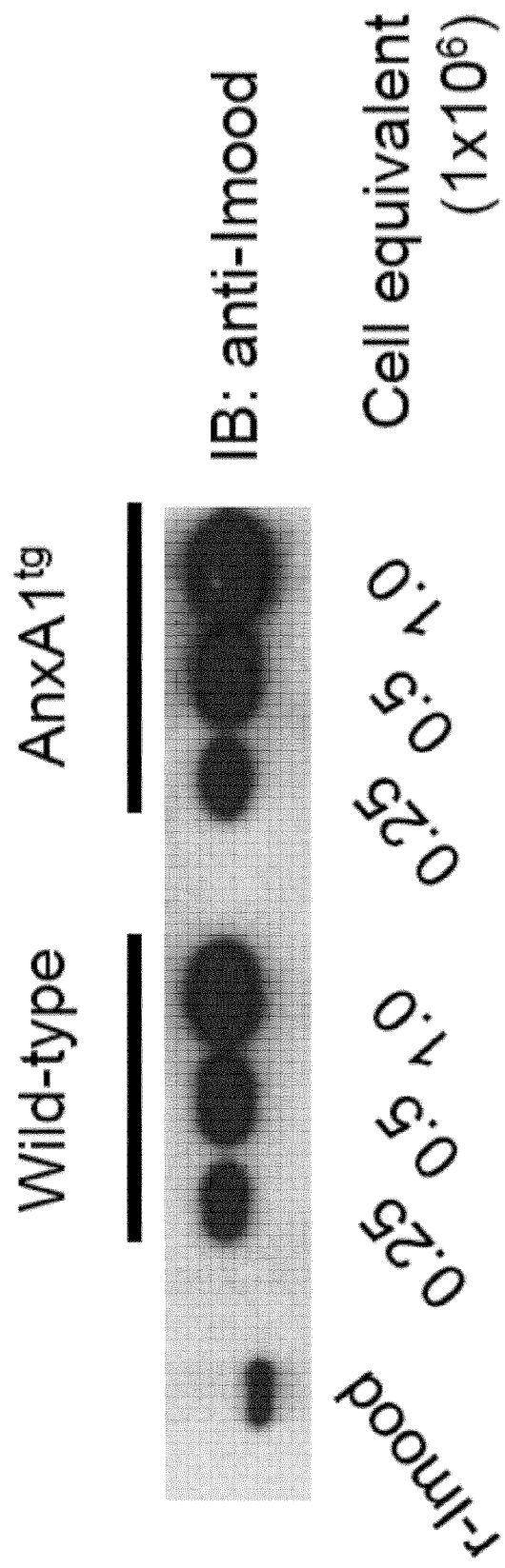
Figure 7A:
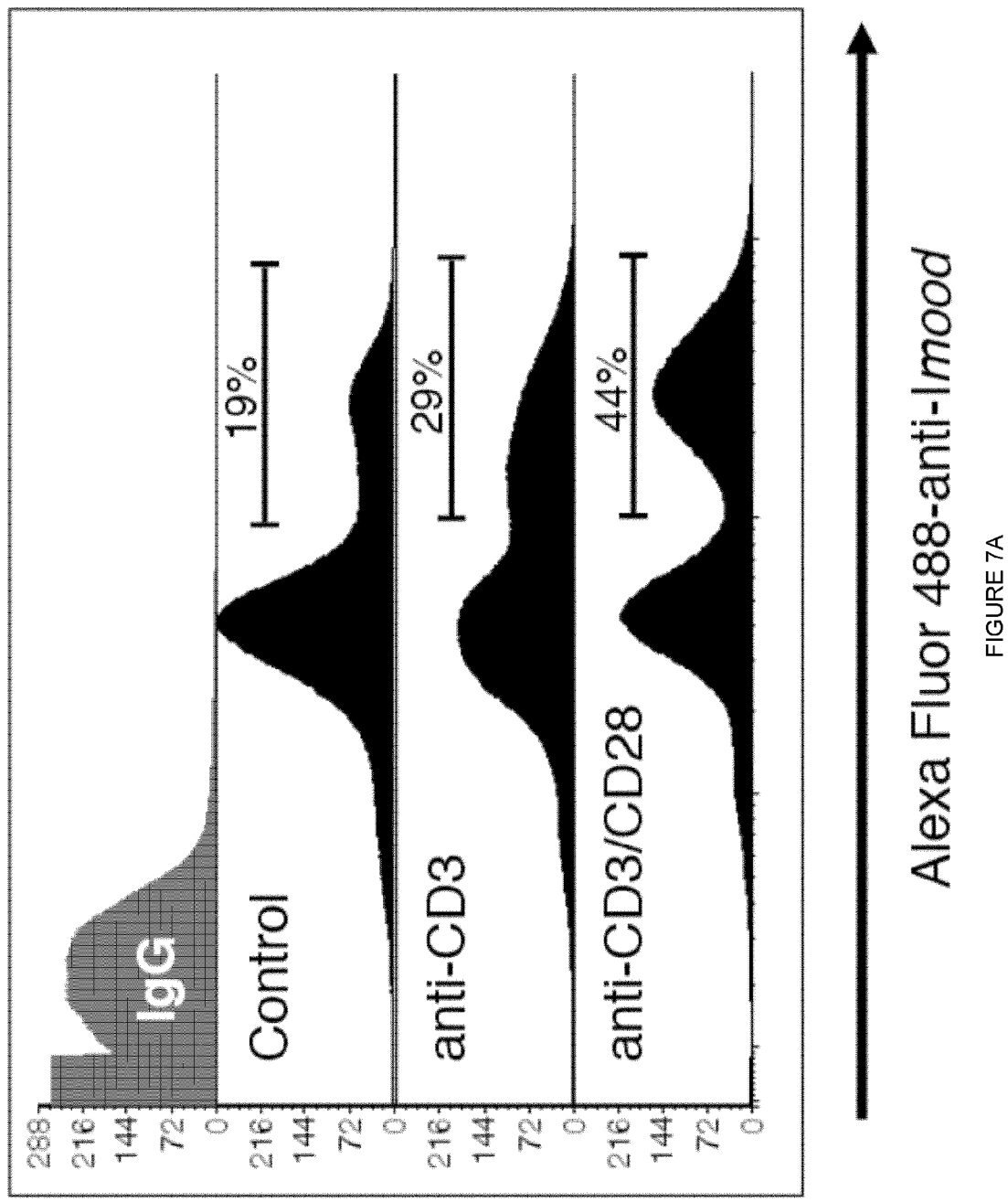
FIG. 7 shows (7A) Imood intracellular staining of CD4+ T cells from C57BL/6 mice cultured overnight in complete medium (Control) or stimulated with 1 µg/ml of plate-bound anti-CD3 or anti-CD3/CD28. The numbers in the gate represent the % of Imood-high expressing cells. The histograms show the results obtained with a single mouse and are representative or n=6-8 animals with similar results. (7B) Imood intracellular staining of CD4+ T from wild type or AnxA1tg mice cultured overnight in complete medium (Control) or stimulated with 1 µg/ml of anti-CD3/CD28. The numbers in the plots show the % of Imood-high expressing cells (in the brackets) and the median fluorescence intensity of the gated region. The histograms show the results obtained with a single mouse and are representative or n=6 animals with similar results. (7C) RT-PCR of Imood expression in CD4+ T cells from wild type and AnxA1tg mice cultured overnight in complete medium (Control) or stimulated with 1 µg/ml of plate-bound anti-CD3 or anti-CD3/CD28. Values are expressed as means±SEM of n=6 mice. p<0.01; *p<0.001 indicate significant values compared to wild type control mice (Student's t-test). (7D) Panel shows the levels of Imood immunoprecipitated from the cell culture medium of CD4+ T cells from wild type and AnxA1tg mice cultured overnight in complete medium (Control) or stimulated with 1 µg/ml of plate-bound anti-CD3 or anti-CD3/CD28. Membranes were immunoblotted with a polyclonal anti-Imood antibody and recombinant Imood (r-Imood) was used as control. The results shown are from a single mouse and are representative of six mice with similar results.
Figure 7B:
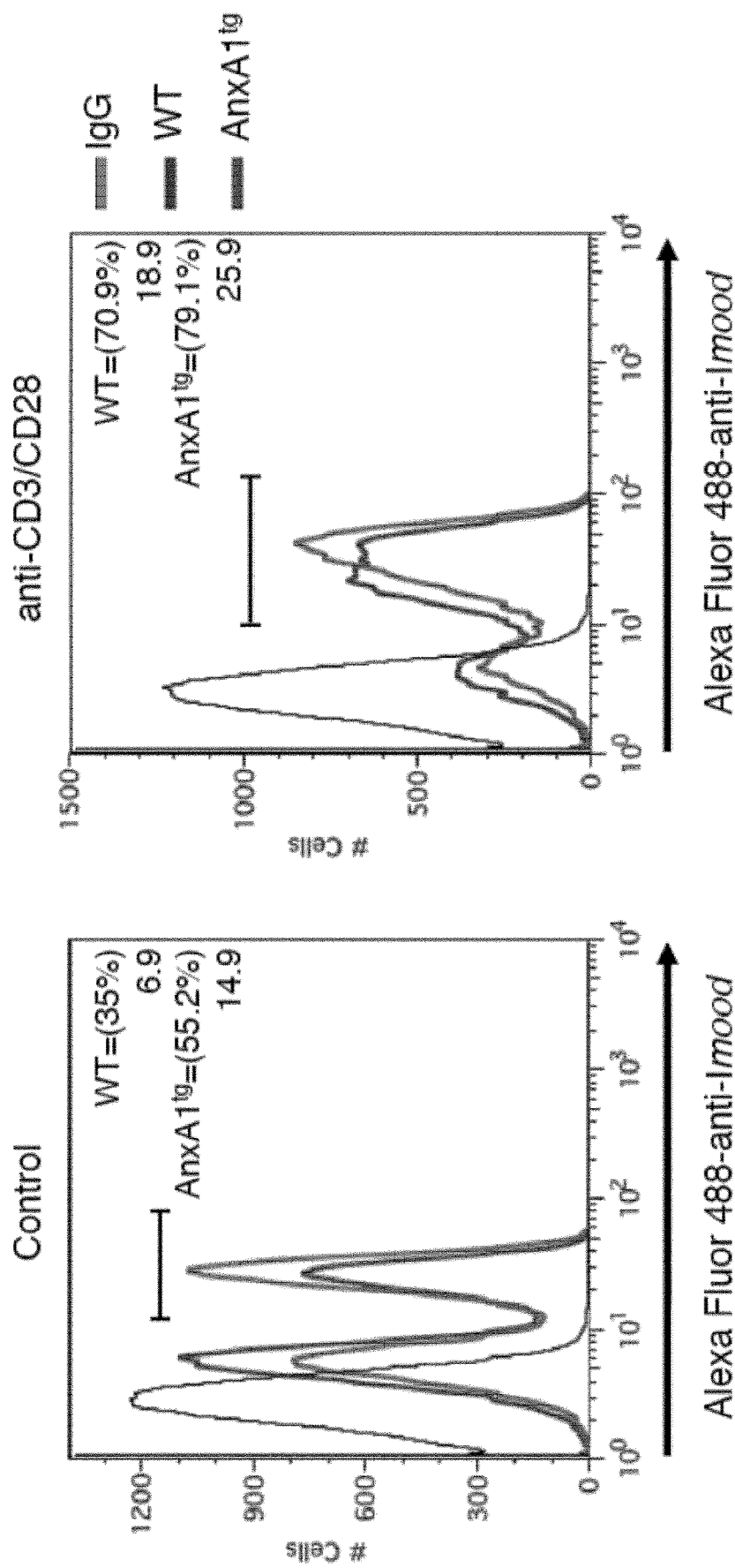
Figure 7C:
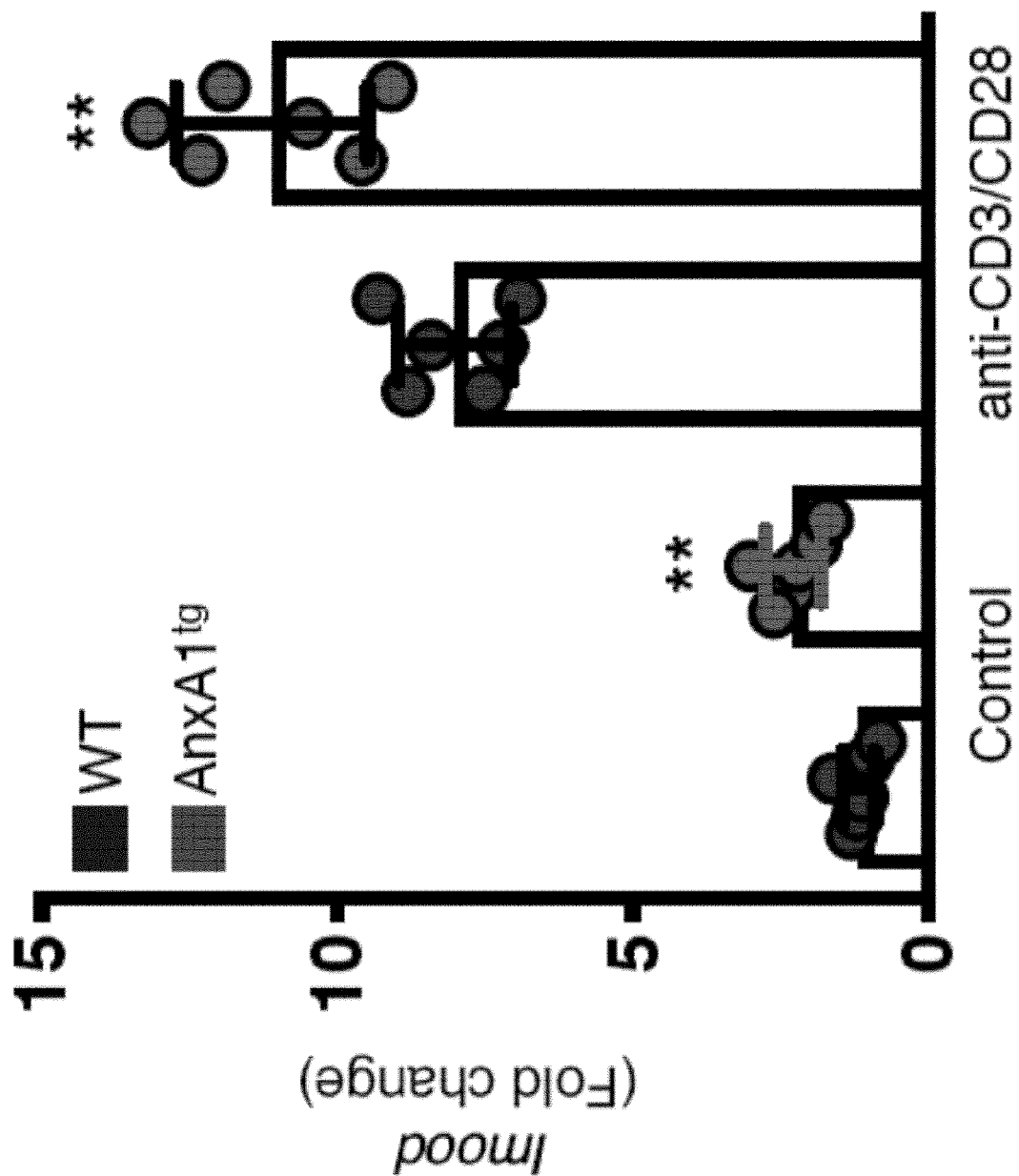
Figure 7D:
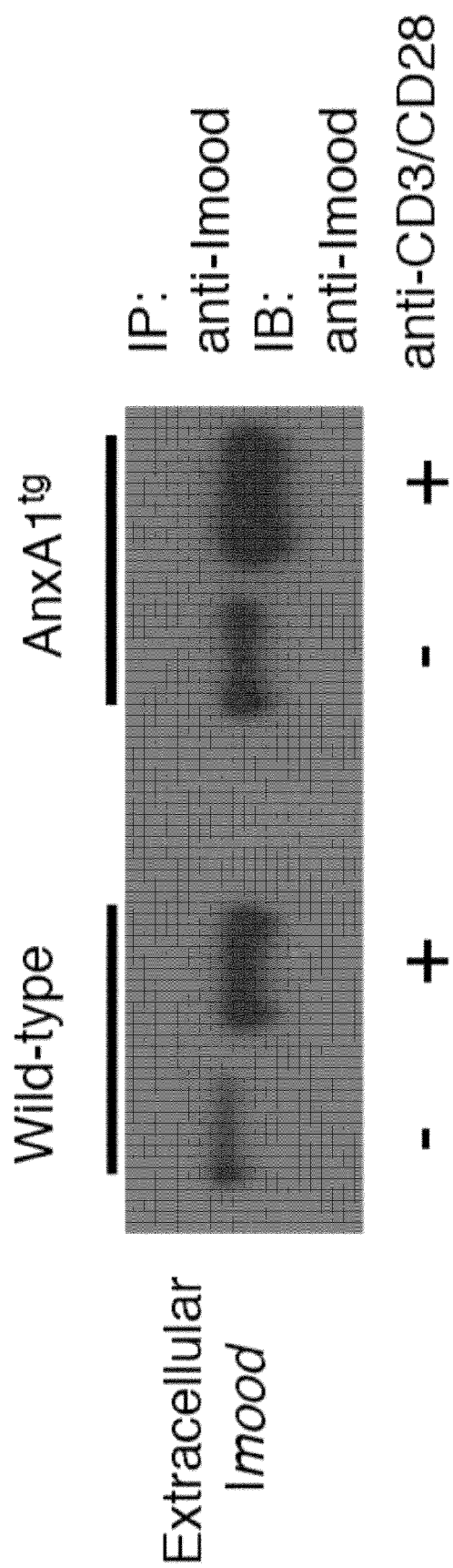

We first investigated Imood expression in resting or activated T cells from non-transgenic C57BL/6 mice. In basal conditions, about 20% of cells express high levels of Imood. Activation of CD4+ T cells via the TCR caused a clear increase in the number of these cells with a doubling of their number (44%) following the triggering of both signal 1 (anti-CD3) and signal 2 (anti-CD28) (FIG. 7A). When we compared the expression of Imood in resting wild type and AnxA1tg CD4+ T cells (FIG. 7B), it was possible to see an increase in the percentages of Imood-high cells in AnxA1tg mice compared to wild type (about 55% in AnxA1tg vs 35% in wild type) and their median fluorescence intensity (about 15 in AnxA1tg vs 7 in wild type). These differences tapered off but remained visible following activation with anti-CD3/CD28: about 80% of AnxA1tg cells expressed Imood with a median fluorescence intensity of 26 while about 70% wild type cells showed a median of 18. These results were confirmed at mRNA levels where it was possible to observe both the upregulation of Imood mRNA following activation of T cells with anti-CD3/CD28 and an increased expression in AnxA1tg compared to wild type in both resting and stimulating conditions (FIG. 7C). We confirmed these findings by western blot. Resting AnxA1tg CD4+ T cells showed increased levels of intracellular Imood compared to control (FIG. 3C). In addition, immunoprecipitation of Imood from the cell supernatant of wild type and AnxA1tg T cells in both resting and activated conditions showed an increased secretion of this protein in AnxA1tg T cells (FIG. 7D).

Figure 3D:
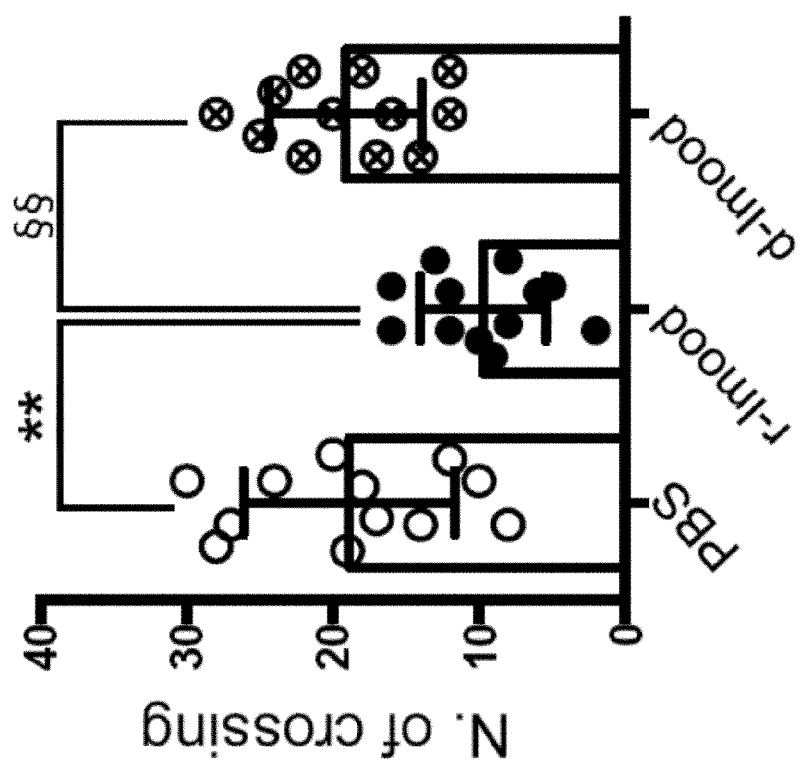
Figure 3D:
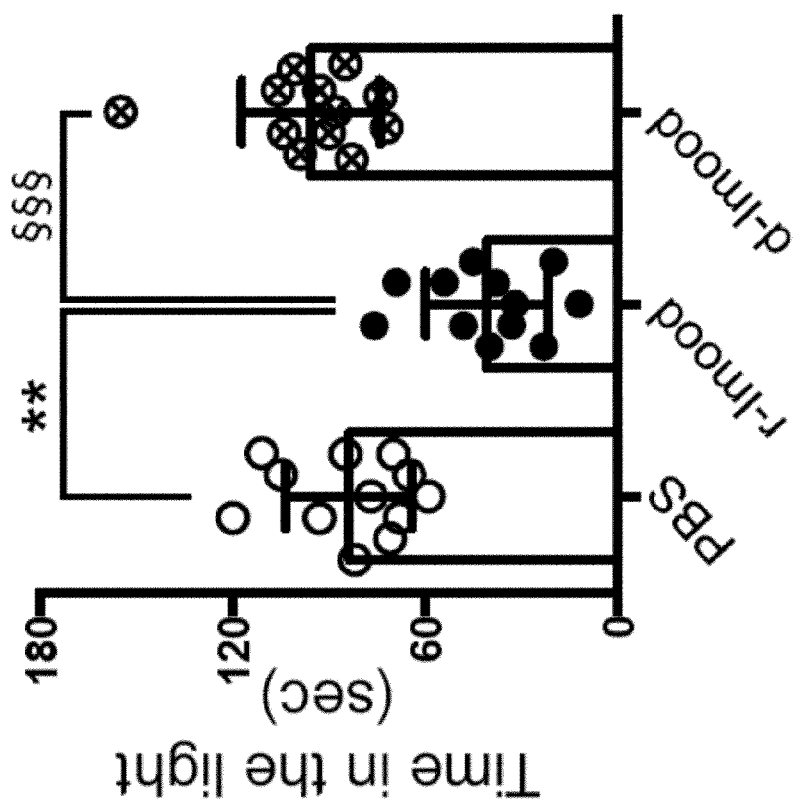
Figure 5:
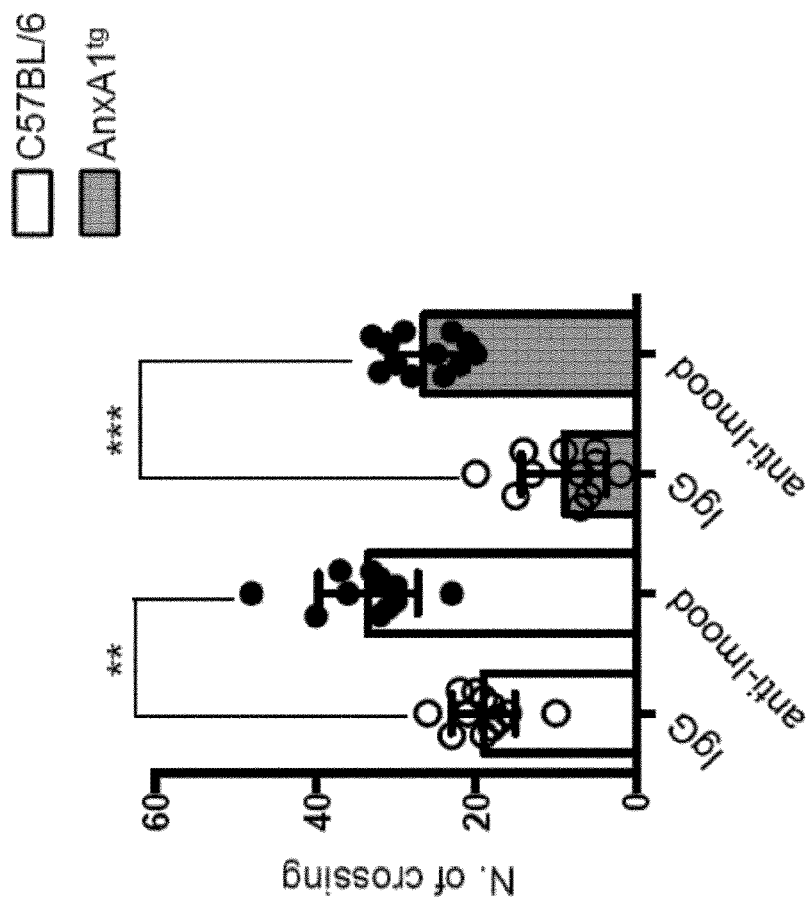
FIG. 5 shows the effect of anti-Imood polyclonal antibody on anxiety-like behaviour of C57BL/6 and AnxA1$^{tg}$ mice. C57BL/6 and AnxA1$^{tg}$ mice received an i.p. injection of polyclonal anti-Imood or IgG control antibodies (500 ng i.p.) and then tested at day 21. The bar graphs show the total time (seconds) spent in the lit area and total number of transition during a 5-minute trial. Values are expressed as means±SEM of two separated experiments with n=6 mice. *p<0.05, p<0.01, *p<0.001, indicate significant values compared with IgG-injected control mice (Mann-Whitney U-test).
Figure 5:
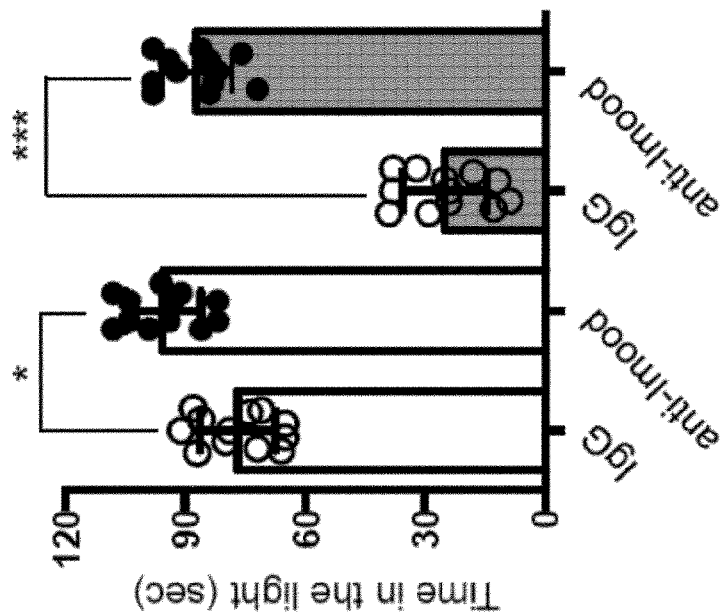

To explore the possible role of Imood in regulating anxiety behavior we administered the recombinant product of this gene into wild type C57BL/6 mice. In all the experiments that followed, we used the light-dark shuttle box as a convenient screening test since this showed the highest difference between AnxA1$^{tg}$ and WT mice. As shown in FIG. 3D, mice injected with the intact (r-Imood but not the denatured (95° C. for 5 min) protein (d-Imood or PBS showed a significant increase in anxiety-like behavior. Similar to what was observed in the adoptive transfer experiments, this change did not occur within hours of administration but started to be noticeable at day 3 post-injection and became highly significant at day 7. To confirm that Imood was indeed responsible for the increased anxiety-like behavior of AnxA1$^{tg}$ mice, we administered the commercially polyclonal antibody and control serum to these mice. We also administered the same dose of antibodies and control serum to wild-type C57BL/6 to test its effect in control mice. As shown in FIG. 5, only AnxA1$^{tg}$ mice that received the polyclonal anti-Imood antibodies but not those receiving the control serum showed a significant increase of the time in the light (by ~249%; p<0.001) and number of crossing (by ~194%; p<0.001). Interestingly, administration of the same antibody in wild-type C57BL/6 mice also caused a significant increase in time in the light (by ~24%; p<0.05) and number of crossing (by ~76%; p<0.01) suggesting there may be an endogenous Imood level which might regulate basal anxiety behaviour of mice.

Figure 6:
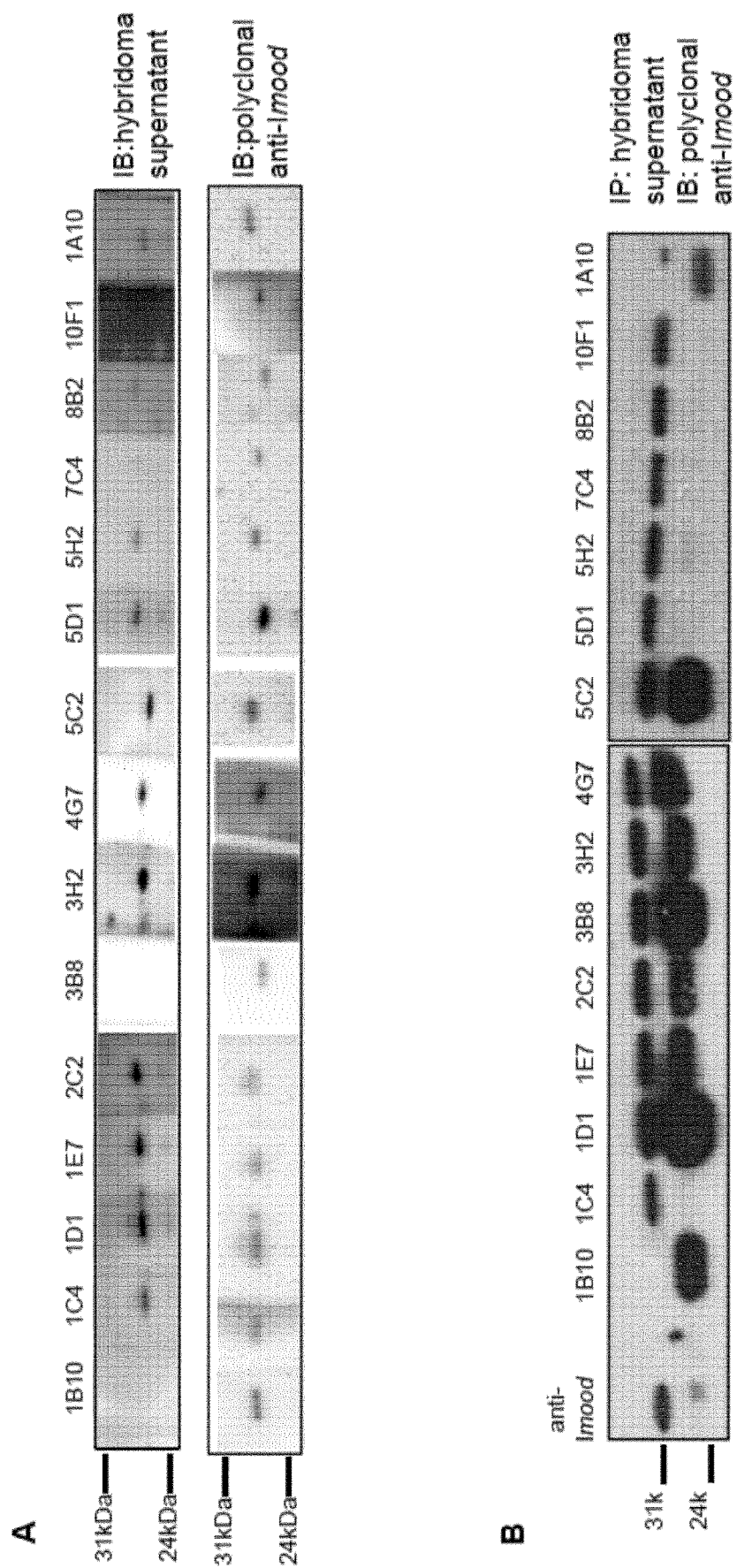
FIG. 6 shows the screening and identification of 1B10 and 1C4 monoclonal anti-Imood antibodies. (6A) Aliquots (50 ng) of recombinant Imood were loaded on a SDS-page gel and then transferred on PVDF membranes as detailed in Materials and Methods. Membranes were immunoblotted with the supernatants from different hybridoma cultures (code names indicated on the top of the top panel). Thereafter, the same membranes were stripped and immunoblotted with a commercially available anti-Imood antibody (bottom panel). (6B) Aliquots (50 ng) of recombinant Imood were immunoprecipitated with hybridoma supernatants and then loaded on a SDS-page gel as detailed in Materials and Methods. Membranes were immunoblotted with a commercially available anti-Imood antibody.

To further validate our hypothesis and increase specificity of action, we generated monoclonal antibodies against Imood using genetic immunization[48] (FIG. 6). Congruent with previous data, administration of highly selective purified monoclonal anti-Imood antibodies 1B10 or 1C4 to AnxA1$^{tg}$ significantly increased the number of crossing (by ~123%, p<0.01 for 1C4; by ~178%, p<0.001 for 1B10) and the time in the light (by ~208%, p<0.01 for 1C4; by ~396%, p<0.001 for 11310) compared to IgG control. Thus anti-Immod therapy rescues the phenotype of AnxA1' back to that of wild type mice.

Figure 4A:
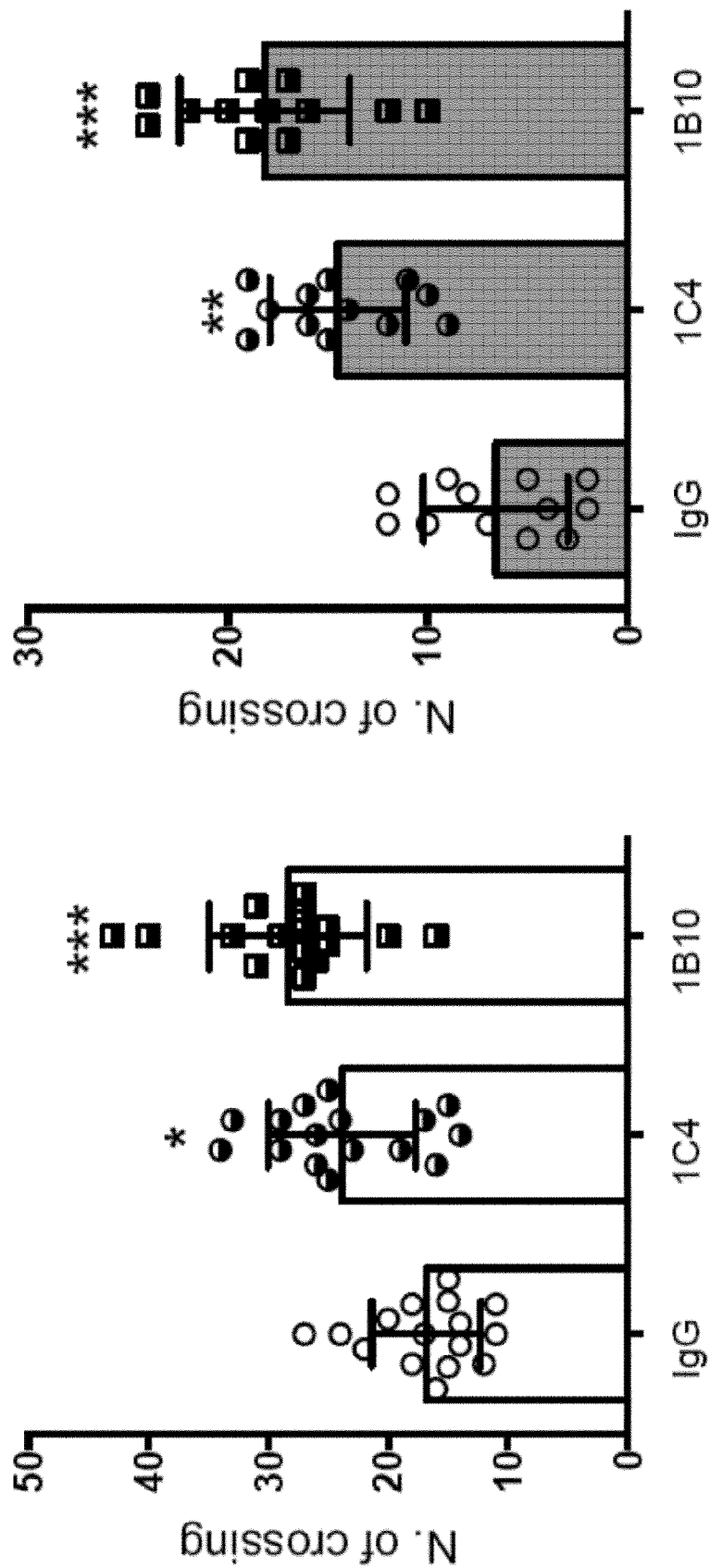
FIG. 4 shows the anxiolytic effects of anti-Immunomoodulin antibodies. (4A) AnxA1$^{tg}$ (white bars) or C57BL/6 (grey bars) mice received an intraperitoneal injection (100 ng/mouse) of anti-Imood antibodies 1C4 and 1B10 and then tested in the light and dark shuttle box test at day 7. The bar graphs show the total time (seconds) spent in the lit area and total number of transition during a 5-minute trial. Values are expressed as means±SEM of two separated experiments with n=6 mice (AnxA1$^{tg}$) or n=9 (C57BL/6) mice. (4B) Real time PCR analysis of Imood in peripheral blood mononuclear cells of patients diagnosed with OCD as described in Materials and Methods. Values are presented as individual data points±SEM of 20 patients. *p<0.05 (t test). (4C) Schematic summery of the study showing how physiological levels of both AnxA1 and Imood play a homeostatic role regulating host immune response and emotional well-being. T cell activation causes the release of AnxA1 and the externalisation of its receptor FPR. This signaling pathway integrates with the TCR and contributes to the regulation of the strength of TCR signalling and the level of T cell activation. Activated T cells express higher levels of Imood. The release of this protein by T cells contribute to a physiological state of lower mood that is similar to the sickness behavior observed following an infection. The increased level of expression of AnxA1 in T cells observed in patients suffering from autoimmune diseases is responsible for the lower threshold of T cell activation and the increased expression of Imood. The increased release of this protein in circulation leads to a state of higher anxiety and depression that is often observed in patients suffering from autoimmune conditions.

Similar to what we observed with the polyclonal antibody, C57BL6 control mice administered with 1B10 and 1C4 showed significant increase in time in the light (by ~75%, p<0.01 for 1C4; by ~86%, p<0.001 for 1B10) and number of crossings (by ~41%, p<0.05 for 1C4; by ~68%, p<0.001 for 1B10). Collectively these data reveal Imood as an innovative target for therapeutic strategies to treat anxiety behavior in mice (FIG. 4A).

Increased Expression of Imood in OCD Patients

Figure 4B:
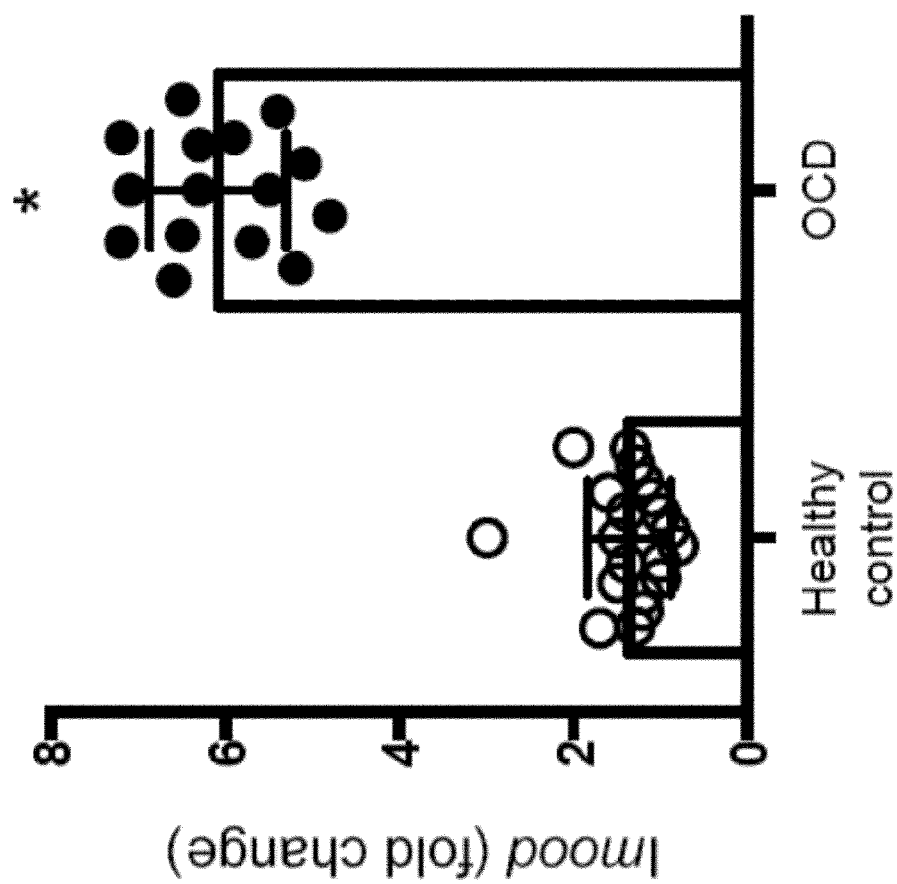
Figure 4C:
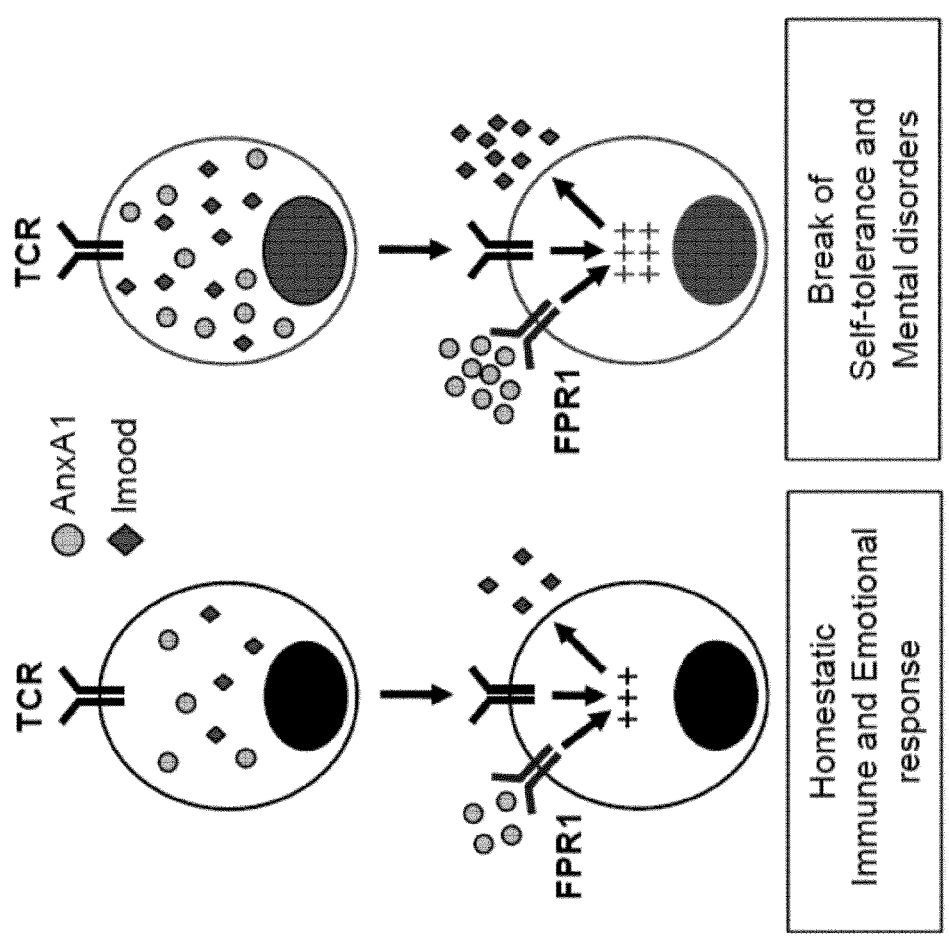

Finally, we searched for Imood expression in man. To this aim, we performed an initial retrospective screening of cDNA samples of PBMC obtained from obtained from 20 patients that have been diagnosed with Obsessive-Compulsive Disorders and 20 healthy controls. As shown in FIG. 4B, Imood expression was significantly higher (approximately 6-fold) than controls.

A growing number of studies support the hypothesis that mood disorders can be driven by cellular and biochemical events that are rooted in the immune system[10, 49, 50]. The lack of novel therapeutic opportunities to treat mental health issues is very topical and we reason that detailed investigation of the mechanism(s) linking the immune system with behavioural responses could guide the development of new therapies. As such, this study adds further evidence for a complex network of crosstalk present at the neuro-immune axis and shows that a new factor produced by T cells endowed with powerful modulatory action on anxiety-like behaviour.

We reasoned about the existence of novel mechanism and plausibly un-identified factors while noting the behavioural phenotype of mice which single anomaly was higher expression of AnxA1 in T cells. This transgenic tool was generated to further investigate the specific properties of this mediator on the adaptive immune response[16, 25, 26]. In retrospective, our novel observations are aligned with the emerging notion that AnxA1 can regulate mental disorders. Genome-Wide Association Studies searches (GWAS Central at www.gwascentral.org) for AnxA1 reported about 62 studies on this protein and many of them on mental disorders. In fact, reports have shown a significant association between AnxA1 gene duplication and autism[51] or single nucleotide polymorphism in AnxA1 gene and schizophrenia[52], bipolar disorder or depression[53]. Most intriguingly, all these conditions have been often linked to immune dysfunctions or inflammatory conditions[54-56].

Moreover, AnxA1 is a ligand for the formyl peptide receptors (FPRs)[57-60]. These prototype sensors of the innate immune system were initially identified as the cellular antenna for the capture of formylated peptides released by bacterial pathogens[61-64]. Of interest, studies have shown that these receptors have more than one way to help the host sensing the danger. Their expression in the olfactory system allow mice to 'sense' the presence of infection-associated olfactory cues thus allowing animals to move away from the source of infection[65-67]. Other lines of evidence support a role for FPR in regulating behaviour. Studies in knock out mice for both FPR1 and FPR2/ALX receptors have shown a significant reduction in anxiety[68,69] e.g. the opposite phenotype of AnxA1$^{tg}$ mice. Putting everything together, FPR may represent a prototype of signalling molecules that influence the behaviour of the host at both cellular and physical levels with the ultimate goal of preserving it from the challenges of the external environments[70].

Adoptive transfer experiments showed a delay for the recipient mice to display a significant increase in anxiety-like behaviour. A similarly delayed response was observed with recombinant Imood suggesting, in both cases, a downstream regulation of the expression of genes associated to anxiety rather than influencing directly the effects of neurotransmitters in the brain.

The time-lag effect for the emergence of modulatory effects on anxiety, with AnxA1$^{tg}$ cells or following the administration of Imood, resonates well with the notion that classical drugs for the treatment of depression and anxiety present a delayed onset of 5 to 7 days for their clinical efficacy to be apparent[71]. Recent studies have put forward the proposition that delayed onset could be linked to the time needed for immune system to respond and/or adapt to the administration of these drugs[72], reinforcing the hypothesis that the immune system regulates the emotional state via a homeostatic control of the expression of genes with direct effect on emotions.

As a novel fine tuner of mental disorders, Imood may be a novel biomarker of prognostic and diagnostic value, enabling patient stratification for the correct mental disorder (e.g. those associated with an immune component) or identification of the right patient subgroup for specific drug treatment. As such, for those with higher expression of Imood, a combinatorial therapy with immunomodulators and Imood neutralizing antibodies like 1B10 might provide the unique opportunity to achieve a 'healthy body in a healthy mind'. Along these lines, the identification of a protein mediator of emotional behavior and the availability of biological therapies that modulate its levels would represent a significant step forward for the treatment of mental disorders. Indeed, a biologic for the treatment of mental disorder would bypass several of the side effects associated with the daily administration of standard therapies for mental disorders[73-75] as it would specifically act at the level of immune system rather than the CNS.

REFERENCES

1. Khandaker G M, Dantzer R, Jones P B. *Psychol Med* 2017; 47(13): 2229-2237.
2. Coutinho E, Vincent A. *Handb Clin Neurol* 2016; 133: 269-282.
3. Feinstein A, Pavisian B. *Mult Scler* 2017; 23(7): 923-927.
4. Pompili M et al. *J Psychosom Res* 2012; 73(6): 411-417.
5. Butt A A, Evans R, Skanderson M, Shakil A O. *J Hepatol* 2006; 44(5): 864-868.
6. Cournos F, McKinnon K, Sullivan G. *J Clin Psychiatry* 2005; 66 Suppl 6: 27-33.
7. Bosche K, et al. *Neuropharmacology* 2015; 96(Pt A): 83-93.
8. Goeb J L, Even C, Nicolas G, Gohier B, Dubas F, Garre J B. *Eur Psychiatry* 2006; 21(3): 186-193.
9. Marin I A, Kipnis J. *Neuropsychopharmacology* 2017; 42(1): 28-35.
10. Dantzer R. *Physiol Rev* 2018; 98(1): 477-504.
11. Sheikh M H, Solito E. Annexin A1: *Int J Mol Sci* 2018; 19(4).
12. Leoni G, Nusrat A *Biol Chem* 2016; 397(10): 971-979.
13. Qin C, Yang Y H, May L, Gao X, Stewart A G, Tu Y et al. *Pharmacol Ther* 2015; 148: 47-65.
14. Perretti M, D'Acquisto F. *Nat Rev Immunol* 2009; 9(1): 62-70.
15. Bruschi M, Petretto A, Vaglio A, Santucci L, Candiano G, Ghiggeri G M. *Int J Mol Sci* 2018; 19(5).
16. D'Acquisto F. *Curr Opin Pharmacol* 2009; 9(4): 521-528.
17. Moraes L A, Ampomah P B, Lim L H K. *Cell Adh Migr* 2018: 1-7.
18. Boudhraa Z, Bouchon B, Viallard C, D'Incan M, Degoul F. *Clin Sci (Lond)* 2016; 130(4): 205-220.
19. Biaoxue R, Xiguang C, Shuanying Y. *Int J Biol Markers* 2014; 29(1): e8-20.
20. Guo C, Liu S, Sun M Z. *Future Oncol* 2013; 9(11): 1773-1793.
21. D'Acquisto F, Piras G, Rattazzi L. *Biochem Pharmacol* 2013; 85(9): 1213-1218.
22. Paschalidis N, et al. R. *Cell Cycle* 2010; 9(4): 784-793.
23. Paschalidis N. *J Neuroinflammation* 2009; 6: 33.
24. Huggins A et al *FASEB J* 2009; 23(4): 985-996.
25. D'Acquisto F, et al *Eur J Immuno* 12007; 37(11): 3131-3142.
26. D'Acquisto F et al *Blood* 2007; 109(3): 1095-1102.
27. Huang P, Zhou Y, Liu Z, Zhang P. *Mediators Inflamm* 2016; 2016: 1701059.
28. Mihaylova N, et al. *Autoimmunity* 2017; 50(4): 257-268.
29. Tzelepis F et al *J Clin Invest* 2015; 125(2): 752-768.
30. Sena A A et al *Sci Rep* 2016; 6: 31157.
31. Odobasic D et al *Int Immunopharmacol* 2018; 61: 140-149.
32. Yazid S et al *J Autoimmun* 2015; 58: 1-11.
33. Yang Y H et al *J Immuno* 12013; 190(3): 997-1007.
34. Carter D B, Kennett M J, Franklin C L. *Comp Med* 2002; 52(5): 452-455.
35. Reeves W H et al *Trends Immunol* 2009; 30(9): 455-464.
36. Rossi B, *Front Immunol* 2016; 7: 506.
37. DuPage M, Bluestone J A. *Nat Rev Immunol* 2016; 16(3): 149-163.
38. Hirota K et al *Nat Immunol* 2011; 12(3): 255-263.
39. Taylor G T et al mice. *Acta Neurobiol Exp (Wars)* 2017; 77(3): 254-260.
40. Bourin M, Hascoet M. *Eur J Pharmacol* 2003; 463(1-3): 55-65.

41. Deacon R M, Rawlins J N. *Behav Brain Res* 2005; 156(2): 241-249.
42. Brooks S P, Dunnett S B. *Nat Rev Neurosci* 2009; 10(7): 519-529.
43. Filiano A J, et al *Nature* 2016; 535(7612): 425-429.
44. Brachman R A, et al *J Neurosci* 2015; 35(4): 1530-1538.
45. Rattazzi L et al *Transl Psychiatry* 2013; 3: e280.
46. Hovatta I et al. *Nature* 2005; 438(7068): 662-666.
47. Engin E et al *Pharmacol Ther* 2012; 136(2): 142-152.
48. Bates M K et al *Biotechniques* 2006; 40(2): 199-208.
49. Miller A H, Haroon E, Felger J C *Neuropsychopharmacology* 2017; 42(1): 334-359.
50. Haroon E, Raison C L, Miller A H. *Neuropsychopharmacology* 2012; 37(1): 137-162.
51. Correia C T et al *Mol Autism* 2014; 5(1): 28.
52. Clark D et al *Mol Psychiatry* 2006; 11(5): 459-470, 423.
53. Huang J et al. *Am J Psychiatry* 2010; 167(10): 1254-1263.
54. Severance E G et al *Pharmacol Ther* 2018; 189: 184-198.
55. Prata J et al *J Neuroinflammation* 2017; 14(1): 179.
56. Muller N. *Dialogues Clin Neurosci* 2017; 19(1): 55-63.
57. Cooray S N et al *Proc Natl Acad Sci USA* 2013; 110(45): 18232-18237.
58. Bena S et al *J Biol Chem* 2012; 287(29): 24690-24697.
59. Pederzoli-Ribeil M et al *Blood* 2010; 116(20): 4288-4296.
60. Gastardelo T S et al. *Am J Pathol* 2009; 174(1): 177-183.
61. Winther M et al *Basic Clin Pharmacol Toxicol* 2018; 122(2): 191-198.
62. Chen K et al *J Autoimmun* 2017; 85: 64-77.
63. Lee H Y et al *J Cell Biochem* 2017; 118(6): 1300-1307.
64. Migeotte I et al *Cytokine Growth Factor Rev* 2006; 17(6): 501-519.
65. Bufe B et al *J Biol Chem* 2012; 287(40): 33644-33655.
66. Ackels T et al. *Front Neuroanat* 2014; 8: 134.
67. Stempel H et al *J Biol Chem* 2016; 291(18): 9762-9775.
68. Gao J L et al. *Behav Genet* 2011; 41(5): 724-733.
69. Gallo I et al. *PLoS One* 2014; 9(12): e114626.
70. Dietschi Q et al *Proc Natl Acad Sci USA* 2017; 114(28): 7397-7402.
71. Lam R W. *Eur Neuropsychopharmacol* 2012; 22 Suppl 3: S492-498.
72. Kiecolt-Glaser J K et al *Annu Rev Psychol* 2002; 53: 83-107.
73. Serretti A, Chiesa A. *Clin Pharmacol Ther* 2011; 89(1): 142-147.
74. Uzun S et al *Psychiatr Danub* 2010; 22(1): 90-93.
75. Babic D et al *Psychiatr Danub* 2010; 22(1): 75-78.

```
                              Sequences 001 mwklgrgrvl ldeppeeedg lrggpppaaa aaaqaqvqga sfrgwkevts ifnkddeqhl
061 lerckspksk gtnlrlkeel kaekksgfwd nlvlkqniqs kkpdeiegwe ppklaledis
121 adpedtvggh pswsgwedda kgstkytsla ssanssrwsl raagrlikev winfsqliis
181 frkhclahyr elrlciky
SEQ ID NO: 1

001 mwklgrgrvl ldeppeeedg lrggpppaaa aaaqaqvqga sfrgwkevts lfnkddeqhl
061 lerckspksk gtnlrlkeel kaekksgfwd nlvlkqniqs kkpdeiegwe ppklaledis
121 adpedtvggh pswsgwedda kgstkytsla ssanssrwsl raagrlvsir rqskghltds
181 peeae
SEQ ID NO: 2

NVAMY
SEQ ID NO: 3 (1B10 VHCDR1)

RIRSKANNYATYYADSVKG
SEQ ID NO: 4 (1B10 VHCDR2)

WVIVPLYFDY
SEQ ID NO: 5 (1B10 VHCDR3)

RSSKSLLSSKGITSLY
SEQ ID NO: 6 (1B10 VLCDR1)

KSLLSSRGITS
SEQ ID NO: 7 (1B10 VLCDR1)

XMSNLAS
where X is independently any amino acid
SEQ ID NO: 8 (1B10 VLCDR2)

QMS
SEQ ID NO: 9 (1B10 VLCDR2)

GHRLQTPFT
SEQ ID NO: 10 (1B10 VLCDR3)

AVQLVESGGGLVQPEESLKISCAASGITFSNVAMYWVRQAPGKGLEWVARIRSKANNYATYYADSVKG
RFTISRDDSKSMVYLQMDNLKTEDTAMYYCSAWVIVPLYFDYWGQGVMVTVSS
SEQ ID NO: 11 (1B10 VH)

001 gcggtgcagc tggttgagtc tggtggagga ttggtgcagc ctgaggagtc attgaaaatc
061 tcatgtgcag cttctggaat caccttcagt aatgttgcca tgtactgggt ccgccaggct
121 ccaggaaagg gtctggaatg ggttgctcgc ataagaagta agctaataa ttatgcaaca
181 tattatgctg attcagtgaa aggcagattc accatctcca gagatgattc aaaaagcatg
241 gtctacctac aaatggataa cttgaaaact gaggacacag ccatgtacta ttgttcagca
301 tgggttatag tgcccctata ttttgattac tggggccaag gagtcatggt cacagtctcc
```

361 tca
SEQ ID NO: 12 (1B10 VH coding)

DIVMTQAPLSVSVTPGESASISCRSSKSLLSSKGITSLYWYLQRPGKSPQLLIYX<sub>1</sub>MSNLASGVPDRF
SX<sub>2</sub>SGSETDFTLKISX<sub>3</sub>VEAEDVGVYYCGHRLQTPFTFGSGTKLEIK
where X$_1$ to X$_3$ are independently any amino acid; preferably X$_1$
is Q, X$_2$ is S and X$_3$ is K
SEQ ID NO: 13 (1B10 VL)

DIVMTQAPLSVSVTPGESASISCRSSKSLLSSKGITSLYWYLQRPGKSPQLLIYQMSNLASGVPDRFSSSGSET
DFTLKISKVEAEDVGVYYCGHRLQTPFTFGSGTKLEIK
SEQ ID NO: 14 (1B10 VL)

001 gatattgtga tgactcaagc tccactctct gtatctgtca ctcctggaga gtcagcttcc
 061 atctcctgca grtctagtaa gagtctgcta agtagtaagg gcatcacttc cttgtattgg
 121 taccttcaga ggccaggaaa gtctcctcag ctcctgatat atcrgatgtc caaccttgcc
 181 tcaggagttc cagacaggtt tagtrgcagt gggtcagaaa ccgattttac actgaaaatc
 241 agtarggtgg aggctgagga tgttggtgtt tattactgtg gacatcgtct acaaactcca
 301 ttcacgttcg gctcagggac gaaattggaa ataaaa
where r is independently any nucleotide
SEQ ID NO: 15 (1B10 VL coding)

001 gatattgtga tgactcaagc tccactctct gtatctgtca ctcctggaga gtcagcttcc
 061 atctcctgca ggtctagtAA GAGTCTGCTA AGTAGTAAGG GCATCACTTC Cttgtattgg
 121 taccttcaga ggccaggaaa gtctcctcag ctcctgatat atCAGATGTC Caaccttgcc
 181 tcaggagttc cagacaggtt tagtagcagt gggtcagaaa ccgattttac actgaaaatc
 241 agtaaggtgg aggctgagga tgttggtgtt tattactgtG GACATCGTCT ACAAACTCCA
 301 TTCACGttcg gctcagggac gaaattggaa ataaaa
SEQ ID NO: 16 (1B10 VL coding; CDRs underlined)

WKLSRSRVLLDEPPEEEDVLRGAPPASAAAPASVRARVGAQGASLRGWKEATSLFNKDDEEHLLETSRSPKSKGTNQRLR
EELKAEKKSGFWDALVLKQNAQPKKPDQIEGWEPPKLTAEDVVADHTEDDRSGCPPWSAWEDDTKGSTKYTSLANSASSS
RWSLRSAGKLVSIRRQSKGHLTETCEEGE
SEQ ID NO: 17 (2610019F03Rik (aa 2-190))

GFTFSDYN
SEQ ID NO: 18 (1C4 VHCDR1)

IIYDGDRT
SEQ ID NO: 19 (1C4 VHCDR2)

ATGLAY
SEQ ID NO: 20 (1C4 VHCDR3)

QSLLYSENKKNY
SEQ ID NO: 21 (11C4 VLCDR1)

WAS
SEQ ID NO: 22 (1C4 VLCDR2)

QQYYNFPST
SEQ ID NO: 23 (1C4 VLCDR3)

EVQLVESGGGLVQPGRSLKLSCAASGFTFSDYNMAWVRQAPKRGLEWVATIIYDGDRTYYRDSVKGRFTISRDKAKTTLY
LQMDSLRSEDTATYYCATGLAYWGQGTLVTVSS
SEQ ID NO: 24 (1C4 VH; CDRs underlined)

001 atggacatca ggctcagctt ggttttcctt gtccttttca taaaaggtgt ccagtgtgag
 061 gtgcagctgg tggagtctgg cggaggctta gtacagcctg gaaggtccct gaaactctcc
 121 tgtgcagcct caggattcac tttcagtgac tataacatgg cctgggtccg ccaggctcca
 181 aagagggtc tggagtgggt cgcaaccatt atttatgatg gtgataggac ttactatcga
 241 gactccctga agggccgatt cactatctcc agagataaag caaaaaccac cctatatttg
 301 caaatggaca gtctgaggtc tgaggacacg gccacttatt actgtgcaac agggcttgct
 361 tactggggcc aaggcactct ggtcactgtc tcttcag
SEQ ID NO: 25 (1C4 VH coding; CDRs underlined)

DIVMTQTPSSQAVSPGEKVTMSCKSSQSLLYSENKKNYLAWYQQKPGQSPKLLIYWASTRESGVPDRFIGSGSG
TDFTLTISSVQAEDLAVYYCQQYYNFPSTFGTGTTLELK
SEQ ID NO: 26 (1C4 VL CDRs underlined)

001 acggaatcac agacccaggt cctcatgtcc ccgctgctct gggtatctgg tacctgtggg
 061 gacattgtga tgacccagac tccatcctcc caggctgtgt caccagggga gaaggtcact
 121 atgagctgca gtccagtca gagtctttta tacagtgaaa acaaaaagaa ctacttggcc
 181 tggtaccagc agaaaccagg gcagtctcct aaactgctga tctactgggc atccactagg
 241 gaatctgggg tccctgatcg cttcataggc agtggatctg gacagattt cactctgacc
 301 atcagcagtg tgcaggcaga agacctggct gtttattact gccagcaata ctataacttt
 361 ccgagcacgt tggaactgg gaccacgctg gagctgaaac

| Sequences |
|---|
| SEQ ID NO: 27 (1C4 VL coding CDRs underlined) |

The invention claimed is:

1. An antibody molecule that specifically binds to testis development related protein (TDRP), said antibody molecule comprising an antigen binding site that comprises a VH domain and a VL domain, wherein the VH domain comprises a VHCDR1 of SEQ ID NO: 3, a VHCDR2 of SEQ ID NO: 4, and a VHCDR3 of SEQ ID NO: 5;
and wherein the VL domain comprises a VLCDR1 of SEQ ID NO: 6, a VLCDR2 of SEQ ID NO: 8, and a VLCDR3 of SEQ ID NO: 10; or the VL domain comprises a VLCDR1 of SEQ ID NO: 7, a VLCDR2 of SEQ ID NO: 9, and a VLCDR3 of SEQ ID NO 10.

2. An antibody molecule according to claim 1 wherein
the VH domain comprises the amino acid sequence of SEQ ID NO: 11 or a variant thereof, wherein said variant comprises a VHCDR1 of SEQ ID NO: 3, a VHCDR2 of SEQ ID NO: 4, and a VHCDR3 of SEQ ID NO: 5, and framework regions sharing at least 70% sequence identity with the framework regions of SEQ ID NO: 11; and
the VL domain comprises the amino acid sequence of SEQ ID NO: 13 or a variant thereof, wherein said variant comprises a VLCDR1 of SEQ ID NO: 6, a VLCDR2 of SEQ ID NO: 8, and a VLCDR3 of SEQ ID NO: 10, and framework regions sharing at least 70% sequence identity with the framework regions of SEQ ID NO: 13; or
the VL domain comprises the amino acid sequence of SEQ ID NO: 14 or a variant thereof, wherein said variant comprises a VLCDR1 of SEQ ID NO: 7, a VLCDR2 of SEQ ID NO: 9, and a VLCDR3 of SEQ ID NO: 10, and framework regions sharing at least 70% sequence identity with the framework regions of SEQ ID NO: 14.

3. A pharmaceutical composition comprising the antibody molecule that specifically binds to TDRP according to claim 1, and a pharmaceutically acceptable excipient.

4. An antibody molecule that specifically binds to testis development related protein (TDRP), said antibody molecule comprising an antigen binding site that comprises a VH domain and a VL domain, wherein the VH domain comprises a VHCDR1 of SEQ ID NO: 18, a VHCDR2 of SEQ ID NO: 19, and a VHCDR3 of SEQ ID NO: 20; and the VL domain comprises a VLCDR1 of SEQ ID NO: 21, a VLCDR2 of SEQ ID NO: 22, and a VLCDR3 of SEQ ID NO: 23.

5. An antibody molecule according to claim 4 wherein
the VH domain comprises the amino acid sequence of SEQ ID NO: 24 or a variant thereof, wherein said variant comprises a VHCDR1 of SEQ ID NO: 18, a VHCDR2 of SEQ ID NO: 19, and a VHCDR3 of SEQ ID NO: 20, and framework regions sharing at least 70% sequence identity with the framework regions of SEQ ID NO: 24; and/or
the VL domain comprises the amino acid sequence of SEQ ID NO: 26 or a variant thereof, wherein said variant comprises a VLCDR1 of SEQ ID NO: 21, a VLCDR2 of SEQ ID NO: 22, and a VLCDR3 of SEQ ID NO: 23, and framework regions sharing at least 70% sequence identity with the framework regions of SEQ ID NO: 26.

6. A pharmaceutical composition comprising the antibody molecule that specifically binds to TDRP according to claim 4, and a pharmaceutically acceptable excipient.

\* \* \* \* \*

SEQUENCE LISTING

<160> NUMBER OF SEQ ID NOS: 29

<210> SEQ ID NO 1
<211> LENGTH: 198
<212> TYPE: PRT
<213> ORGANISM: Homo sapiens

<400> SEQUENCE: 1

```
Met Trp Lys Leu Gly Arg Gly Arg Val Leu Leu Asp Glu Pro Pro Glu
1               5                   10                  15

Glu Glu Asp Gly Leu Arg Gly Gly Pro Pro Ala Ala Ala Ala Ala Ala
                20                  25                  30

Ala Gln Ala Gln Val Gln Gly Ala Ser Phe Arg Gly Trp Lys Glu Val
        35                  40                  45

Thr Ser Leu Phe Asn Lys Asp Asp Glu Gln His Leu Leu Glu Arg Cys
    50                  55                  60

Lys Ser Pro Lys Ser Lys Gly Thr Asn Leu Arg Leu Lys Glu Glu Leu
65                  70                  75                  80

Lys Ala Glu Lys Lys Ser Gly Phe Trp Asp Asn Leu Val Leu Lys Gln
                85                  90                  95

Asn Ile Gln Ser Lys Lys Pro Asp Glu Ile Glu Gly Trp Glu Pro Pro
            100                 105                 110

Lys Leu Ala Leu Glu Asp Ile Ser Ala Asp Pro Glu Asp Thr Val Gly
        115                 120                 125

Gly His Pro Ser Trp Ser Gly Trp Glu Asp Asp Ala Lys Gly Ser Thr
    130                 135                 140

Lys Tyr Thr Ser Leu Ala Ser Ser Ala Asn Ser Ser Arg Trp Ser Leu
145                 150                 155                 160

Arg Ala Ala Gly Arg Leu Ile Lys Glu Val Trp Ile Asn Phe Ser Gln
                165                 170                 175

Leu Ile Ile Ser Phe Arg Lys His Cys Leu Ala His Tyr Arg Glu Leu
            180                 185                 190

Arg Leu Cys Ile Lys Tyr
        195
```

<210> SEQ ID NO 2
<211> LENGTH: 185
<212> TYPE: PRT
<213> ORGANISM: Artificial Sequence
<220> FEATURE:
<223> OTHER INFORMATION: TDRP binding sequence

<400> SEQUENCE: 2

```
Met Trp Lys Leu Gly Arg Gly Arg Val Leu Leu Asp Glu Pro Pro Glu
1               5                   10                  15

Glu Glu Asp Gly Leu Arg Gly Gly Pro Pro Ala Ala Ala Ala Ala Ala
                20                  25                  30

Ala Gln Ala Gln Val Gln Gly Ala Ser Phe Arg Gly Trp Lys Glu Val
        35                  40                  45

Thr Ser Leu Phe Asn Lys Asp Asp Glu Gln His Leu Leu Glu Arg Cys
    50                  55                  60
```

```
Lys Ser Pro Lys Ser Lys Gly Thr Asn Leu Arg Leu Lys Glu Glu Leu
 65                  70                  75                  80

Lys Ala Glu Lys Ser Gly Phe Trp Asp Asn Leu Val Leu Lys Gln
                 85                  90                  95

Asn Ile Gln Ser Lys Lys Pro Asp Glu Ile Glu Gly Trp Glu Pro Pro
            100                 105                 110

Lys Leu Ala Leu Glu Asp Ile Ser Ala Asp Pro Glu Asp Thr Val Gly
        115                 120                 125

Gly His Pro Ser Trp Ser Gly Trp Glu Asp Asp Ala Lys Gly Ser Thr
    130                 135                 140

Lys Tyr Thr Ser Leu Ala Ser Ser Ala Asn Ser Ser Arg Trp Ser Leu
145                 150                 155                 160

Arg Ala Ala Gly Arg Leu Val Ser Ile Arg Arg Gln Ser Lys Gly His
                165                 170                 175

Leu Thr Asp Ser Pro Glu Glu Ala Glu
            180                 185

<210> SEQ ID NO 3
<211> LENGTH: 5
<212> TYPE: PRT
<213> ORGANISM: Artificial Sequence
<220> FEATURE:
<223> OTHER INFORMATION: 1B10 VHCDR1

<400> SEQUENCE: 3

Asn Val Ala Met Tyr
1               5

<210> SEQ ID NO 4
<211> LENGTH: 19
<212> TYPE: PRT
<213> ORGANISM: Artificial Sequence
<220> FEATURE:
<223> OTHER INFORMATION: 1B10 VHCDR2

<400> SEQUENCE: 4

Arg Ile Arg Ser Lys Ala Asn Asn Tyr Ala Thr Tyr Tyr Ala Asp Ser
1               5                   10                  15

Val Lys Gly

<210> SEQ ID NO 5
<211> LENGTH: 10
<212> TYPE: PRT
<213> ORGANISM: Artificial Sequence
<220> FEATURE:
<223> OTHER INFORMATION: 1B10 VHCDR3

<400> SEQUENCE: 5

Trp Val Ile Val Pro Leu Tyr Phe Asp Tyr
1               5                   10

<210> SEQ ID NO 6
<211> LENGTH: 16
<212> TYPE: PRT
<213> ORGANISM: Artificial Sequence
<220> FEATURE:
<223> OTHER INFORMATION: 1B10 VLCDR1

<400> SEQUENCE: 6

Arg Ser Ser Lys Ser Leu Leu Ser Ser Lys Gly Ile Thr Ser Leu Tyr
1               5                   10                  15
```

<210> SEQ ID NO 7
<211> LENGTH: 11
<212> TYPE: PRT
<213> ORGANISM: Artificial Sequence
<220> FEATURE:
<223> OTHER INFORMATION: 1B10 VLCDR1

<400> SEQUENCE: 7

Lys Ser Leu Leu Ser Ser Lys Gly Ile Thr Ser
1               5                   10

<210> SEQ ID NO 8
<211> LENGTH: 7
<212> TYPE: PRT
<213> ORGANISM: Artificial Sequence
<220> FEATURE:
<223> OTHER INFORMATION: 1B10 VLCDR2
<220> FEATURE:
<221> NAME/KEY: misc_feature
<222> LOCATION: (1)..(1)
<223> OTHER INFORMATION: Xaa can be any naturally occurring amino acid

<400> SEQUENCE: 8

Xaa Met Ser Asn Leu Ala Ser
1               5

<210> SEQ ID NO 9
<211> LENGTH: 3
<212> TYPE: PRT
<213> ORGANISM: Artificial Sequence
<220> FEATURE:
<223> OTHER INFORMATION: 1B10 VLCDR2

<400> SEQUENCE: 9

Gln Met Ser
1

<210> SEQ ID NO 10
<211> LENGTH: 9
<212> TYPE: PRT
<213> ORGANISM: Artificial Sequence
<220> FEATURE:
<223> OTHER INFORMATION: 1B10 VLCDR3

<400> SEQUENCE: 10

Gly His Arg Leu Gln Thr Pro Phe Thr
1               5

<210> SEQ ID NO 11
<211> LENGTH: 121
<212> TYPE: PRT
<213> ORGANISM: Artificial Sequence
<220> FEATURE:
<223> OTHER INFORMATION: 1B10 VH

<400> SEQUENCE: 11

Ala Val Gln Leu Val Glu Ser Gly Gly Gly Leu Val Gln Pro Glu Glu
1               5                   10                  15

Ser Leu Lys Ile Ser Cys Ala Ala Ser Gly Ile Thr Phe Ser Asn Val
            20                  25                  30

Ala Met Tyr Trp Val Arg Gln Ala Pro Gly Lys Gly Leu Glu Trp Val
        35                  40                  45

Ala Arg Ile Arg Ser Lys Ala Asn Asn Tyr Ala Thr Tyr Tyr Ala Asp
    50                  55                  60

Ser Val Lys Gly Arg Phe Thr Ile Ser Arg Asp Asp Ser Lys Ser Met

```
                65                  70                  75                  80
Val Tyr Leu Gln Met Asp Asn Leu Lys Thr Glu Asp Thr Ala Met Tyr
                            85                  90                  95

Tyr Cys Ser Ala Trp Val Ile Val Pro Leu Tyr Phe Asp Tyr Trp Gly
                100                 105                 110

Gln Gly Val Met Val Thr Val Ser Ser
            115                 120

<210> SEQ ID NO 12
<211> LENGTH: 363
<212> TYPE: DNA
<213> ORGANISM: Artificial Sequence
<220> FEATURE:
<223> OTHER INFORMATION: 1B10 VH coding

<400> SEQUENCE: 12
gcggtgcagc tggttgagtc tgtggagga ttggtgcagc ctgaggagtc attgaaaatc      60
tcatgtgcag cttctggaat caccttcagt aatgttgcca tgtactgggt ccgccaggct    120
ccaggaaagg gtctggaatg ggttgctcgc ataagaagta aagctaataa ttatgcaaca    180
tattatgctg attcagtgaa aggcagattc accatctcca gagatgattc aaaaagcatg    240
gtctacctac aaatggataa cttgaaaact gaggacacag ccatgtacta ttgttcagca    300
tgggttatag tgcccctata ttttgattac tggggccaag gagtcatggt cacagtctcc    360
tca                                                                  363

<210> SEQ ID NO 13
<211> LENGTH: 112
<212> TYPE: PRT
<213> ORGANISM: Artificial Sequence
<220> FEATURE:
<223> OTHER INFORMATION: 1B10 VL
<220> FEATURE:
<221> NAME/KEY: MISC_FEATURE
<222> LOCATION: (55)..(55)
<223> OTHER INFORMATION: Xaa = independently any amino acid; preferably
      Q
<220> FEATURE:
<221> NAME/KEY: MISC_FEATURE
<222> LOCATION: (69)..(69)
<223> OTHER INFORMATION: Xaa = independently any amino acid; preferably
      S
<220> FEATURE:
<221> NAME/KEY: MISC_FEATURE
<222> LOCATION: (82)..(82)
<223> OTHER INFORMATION: Xaa = independently any amino acid; preferably
      K

<400> SEQUENCE: 13

Asp Ile Val Met Thr Gln Ala Pro Leu Ser Val Ser Val Thr Pro Gly
1               5                   10                  15

Glu Ser Ala Ser Ile Ser Cys Arg Ser Ser Lys Ser Leu Leu Ser Ser
            20                  25                  30

Lys Gly Ile Thr Ser Leu Tyr Trp Tyr Leu Gln Arg Pro Gly Lys Ser
        35                  40                  45

Pro Gln Leu Leu Ile Tyr Xaa Met Ser Asn Leu Ala Ser Gly Val Pro
    50                  55                  60

Asp Arg Phe Ser Xaa Ser Gly Ser Glu Thr Asp Phe Thr Leu Lys Ile
65                  70                  75                  80

Ser Xaa Val Glu Ala Glu Asp Val Gly Val Tyr Tyr Cys Gly His Arg
            85                  90                  95

Leu Gln Thr Pro Phe Thr Phe Gly Ser Gly Thr Lys Leu Glu Ile Lys
```

<210> SEQ ID NO 14
<211> LENGTH: 112
<212> TYPE: PRT
<213> ORGANISM: Artificial Sequence
<220> FEATURE:
<223> OTHER INFORMATION: 1B10 VL

<400> SEQUENCE: 14

Asp Ile Val Met Thr Gln Ala Pro Leu Ser Val Ser Val Thr Pro Gly
 1               5                  10                  15

Glu Ser Ala Ser Ile Ser Cys Arg Ser Ser Lys Ser Leu Leu Ser Ser
            20                  25                  30

Lys Gly Ile Thr Ser Leu Tyr Trp Tyr Leu Gln Arg Pro Gly Lys Ser
        35                  40                  45

Pro Gln Leu Leu Ile Tyr Gln Met Ser Asn Leu Ala Ser Gly Val Pro
    50                  55                  60

Asp Arg Phe Ser Ser Ser Gly Ser Glu Thr Asp Phe Thr Leu Lys Ile
65                  70                  75                  80

Ser Lys Val Glu Ala Glu Asp Val Gly Val Tyr Tyr Cys Gly His Arg
                85                  90                  95

Leu Gln Thr Pro Phe Thr Phe Gly Ser Gly Thr Lys Leu Glu Ile Lys
            100                 105                 110

<210> SEQ ID NO 15
<211> LENGTH: 336
<212> TYPE: DNA
<213> ORGANISM: Artificial Sequence
<220> FEATURE:
<223> OTHER INFORMATION: 1B10 VL coding
<220> FEATURE:
<221> NAME/KEY: misc_feature
<222> LOCATION: (72)..(72)
<223> OTHER INFORMATION: n is a, c, g, or t
<220> FEATURE:
<221> NAME/KEY: misc_feature
<222> LOCATION: (164)..(164)
<223> OTHER INFORMATION: n is a, c, g, or t
<220> FEATURE:
<221> NAME/KEY: misc_feature
<222> LOCATION: (205)..(205)
<223> OTHER INFORMATION: n is a, c, g, or t
<220> FEATURE:
<221> NAME/KEY: misc_feature
<222> LOCATION: (245)..(245)
<223> OTHER INFORMATION: n is a, c, g, or t

<400> SEQUENCE: 15
gatattgtga tgactcaagc tccactctct gtatctgtca ctcctggaga gtcagcttcc      60
atctcctgca gntctagtaa gagtctgcta agtagtaagg gcatcacttc cttgtattgg    120
taccttcaga ggccaggaaa gtctcctcag ctcctgatat atcngatgtc caaccttgcc    180
tcaggagttc cagacaggtt tagtngcagt gggtcagaaa ccgatttac actgaaaatc     240 agtanggtgg aggctgagga tgttggtgtt tattactgtg gacatcgtct acaaactcca    300
ttcacgttcg gctcagggac gaaattggaa ataaaa                              336

<210> SEQ ID NO 16
<211> LENGTH: 336
<212> TYPE: DNA
<213> ORGANISM: Artificial Sequence
<220> FEATURE:
<223> OTHER INFORMATION: 1B10 VL coding -continued

<400> SEQUENCE: 16

```
gatattgtga tgactcaagc tccactctct gtatctgtca ctcctggaga gtcagcttcc      60
atctcctgca ggtctagtaa gagtctgcta agtagtaagg gcatcacttc cttgtattgg     120
taccttcaga ggccaggaaa gtctcctcag ctcctgatat atcagatgtc caaccttgcc     180
tcaggagttc cagacaggtt tagtagcagt gggtcagaaa ccgattttac actgaaaatc     240
agtaaggtgg aggctgagga tgttggtgtt tattactgtg acatcgtct acaaactcca      300
ttcacgttcg gctcagggac gaaattggaa ataaaa                                336
```

```
<210> SEQ ID NO 17
<211> LENGTH: 189
<212> TYPE: PRT
<213> ORGANISM: Artificial Sequence
<220> FEATURE:
<223> OTHER INFORMATION: 2610019F03Rik (aa 2-190)
```

<400> SEQUENCE: 17

```
Trp Lys Leu Ser Arg Ser Arg Val Leu Leu Asp Glu Pro Pro Glu Glu
1               5                   10                  15

Glu Asp Val Leu Arg Gly Ala Pro Pro Ala Ser Ala Ala Ala Pro Ala
            20                  25                  30

Ser Val Arg Ala Arg Val Gly Ala Gln Gly Ala Ser Leu Arg Gly Trp
        35                  40                  45

Lys Glu Ala Thr Ser Leu Phe Asn Lys Asp Asp Glu Glu His Leu Leu
    50                  55                  60

Glu Thr Ser Arg Ser Pro Lys Ser Lys Gly Thr Asn Gln Arg Leu Arg
65                  70                  75                  80

Glu Glu Leu Lys Ala Glu Lys Lys Ser Gly Phe Trp Asp Ala Leu Val
                85                  90                  95

Leu Lys Gln Asn Ala Gln Pro Lys Lys Pro Asp Gln Ile Glu Gly Trp
            100                 105                 110

Glu Pro Pro Lys Leu Thr Ala Glu Asp Val Val Ala Asp His Thr Glu
        115                 120                 125

Asp Asp Arg Ser Gly Cys Pro Pro Trp Ser Ala Trp Glu Asp Asp Thr
    130                 135                 140

Lys Gly Ser Thr Lys Tyr Thr Ser Leu Ala Asn Ser Ala Ser Ser Ser
145                 150                 155                 160

Arg Trp Ser Leu Arg Ser Ala Gly Lys Leu Val Ser Ile Arg Arg Gln
                165                 170                 175

Ser Lys Gly His Leu Thr Glu Thr Cys Glu Glu Gly Glu
            180                 185
```

```
<210> SEQ ID NO 18
<211> LENGTH: 8
<212> TYPE: PRT
<213> ORGANISM: Artificial Sequence
<220> FEATURE:
<223> OTHER INFORMATION: 1C4 VHCDR1
```

<400> SEQUENCE: 18

```
Gly Phe Thr Phe Ser Asp Tyr Asn
1               5
```

```
<210> SEQ ID NO 19
<211> LENGTH: 8
<212> TYPE: PRT
<213> ORGANISM: Artificial Sequence
<220> FEATURE:
```

```
<223> OTHER INFORMATION: 1C4 VHCDR2

<400> SEQUENCE: 19

Ile Ile Tyr Asp Gly Asp Arg Thr
1               5

<210> SEQ ID NO 20
<211> LENGTH: 6
<212> TYPE: PRT
<213> ORGANISM: Artificial Sequence
<220> FEATURE:
<223> OTHER INFORMATION: 1C4 VHCDR3

<400> SEQUENCE: 20

Ala Thr Gly Leu Ala Tyr
1               5

<210> SEQ ID NO 21
<211> LENGTH: 12
<212> TYPE: PRT
<213> ORGANISM: Artificial Sequence
<220> FEATURE:
<223> OTHER INFORMATION: 11C4 VLCDR1

<400> SEQUENCE: 21

Gln Ser Leu Leu Tyr Ser Glu Asn Lys Lys Asn Tyr
1               5                   10

<210> SEQ ID NO 22
<211> LENGTH: 3
<212> TYPE: PRT
<213> ORGANISM: Artificial Sequence
<220> FEATURE:
<223> OTHER INFORMATION: 1C4 VLCDR2

<400> SEQUENCE: 22

Trp Ala Ser
1

<210> SEQ ID NO 23
<211> LENGTH: 9
<212> TYPE: PRT
<213> ORGANISM: Artificial Sequence
<220> FEATURE:
<223> OTHER INFORMATION: 1C4 VLCDR3

<400> SEQUENCE: 23

Gln Gln Tyr Tyr Asn Phe Pro Ser Thr
1               5

<210> SEQ ID NO 24
<211> LENGTH: 113
<212> TYPE: PRT
<213> ORGANISM: Artificial Sequence
<220> FEATURE:
<223> OTHER INFORMATION: 1C4 VH

<400> SEQUENCE: 24

Glu Val Gln Leu Val Glu Ser Gly Gly Gly Leu Val Gln Pro Gly Arg
1               5                   10                  15

Ser Leu Lys Leu Ser Cys Ala Ala Ser Gly Phe Thr Phe Ser Asp Tyr
            20                  25                  30

Asn Met Ala Trp Val Arg Gln Ala Pro Lys Arg Gly Leu Glu Trp Val
        35                  40                  45

Ala Thr Ile Ile Tyr Asp Gly Asp Arg Thr Tyr Tyr Arg Asp Ser Val
```

```
                    50                  55                  60
Lys Gly Arg Phe Thr Ile Ser Arg Asp Lys Ala Lys Thr Thr Leu Tyr
 65                  70                  75                  80

Leu Gln Met Asp Ser Leu Arg Ser Glu Asp Thr Ala Thr Tyr Tyr Cys
                 85                  90                  95

Ala Thr Gly Leu Ala Tyr Trp Gly Gln Gly Thr Leu Val Thr Val Ser
            100                 105                 110

Ser
```

<210> SEQ ID NO 25
<211> LENGTH: 397
<212> TYPE: DNA
<213> ORGANISM: Artificial Sequence
<220> FEATURE:
<223> OTHER INFORMATION: 1C4 VH coding

<400> SEQUENCE: 25

```
atggacatca ggctcagctt ggttttcctt gtccttttca taaaaggtgt ccagtgtgag    60
gtgcagctgg tggagtctgg cggaggctta gtacagcctg aaggtccct gaaactctcc    120
tgtgcagcct caggattcac tttcagtgac tataacatgg cctgggtccg ccaggctcca    180
aagagggtc tggagtgggt cgcaaccatt atttatgatg gtgataggac ttactatcga    240
gactccgtga aggccgatt cactatctcc agagataaag caaaaccac cctatatttg    300
caaatggaca gtctgaggtc tgaggacacg gccacttatt actgtgcaac agggcttgct    360
tactggggcc aaggcactct ggtcactgtc tcttcag                             397
```

<210> SEQ ID NO 26
<211> LENGTH: 113
<212> TYPE: PRT
<213> ORGANISM: Artificial Sequence
<220> FEATURE:
<223> OTHER INFORMATION: 1C4 VL

<400> SEQUENCE: 26

```
Asp Ile Val Met Thr Gln Thr Pro Ser Ser Gln Ala Val Ser Pro Gly
  1               5                  10                  15

Glu Lys Val Thr Met Ser Cys Lys Ser Ser Gln Ser Leu Leu Tyr Ser
                 20                  25                  30

Glu Asn Lys Lys Asn Tyr Leu Ala Trp Tyr Gln Lys Pro Gly Gln
             35                  40                  45

Ser Pro Lys Leu Leu Ile Tyr Trp Ala Ser Thr Arg Glu Ser Gly Val
         50                  55                  60

Pro Asp Arg Phe Ile Gly Ser Gly Ser Gly Thr Asp Phe Thr Leu Thr
 65                  70                  75                  80

Ile Ser Ser Val Gln Ala Glu Asp Leu Ala Val Tyr Tyr Cys Gln Gln
                 85                  90                  95

Tyr Tyr Asn Phe Pro Ser Thr Phe Gly Thr Gly Thr Thr Leu Glu Leu
            100                 105                 110

Lys
```

<210> SEQ ID NO 27
<211> LENGTH: 400
<212> TYPE: DNA
<213> ORGANISM: Artificial Sequence
<220> FEATURE:
<223> OTHER INFORMATION: 1C4 VL coding

<400> SEQUENCE: 27

```
atggaatcac agaccaggt cctcatgtcc ctgctgctct gggtatctgg tacctgtggg      60
gacattgtga tgacccagac tccatcctcc caggctgtgt caccagggga gaaggtcact    120
atgagctgca agtccagtca gagtctttta tacagtgaaa acaaaaagaa ctacttggcc    180
tggtaccagc agaaaccagg gcagtctcct aaactgctga tctactgggc atccactagg    240
gaatctgggg tccctgatcg cttcataggc agtggatctg ggacagattt cactctgacc    300
atcagcagtg tgcaggcaga agacctggct gtttattact gccagcaata ctataacttt    360
ccgagcacgt ttggaactgg gaccacgctg gagctgaaac                           400

<210> SEQ ID NO 28
<211> LENGTH: 24
<212> TYPE: DNA
<213> ORGANISM: Artificial Sequence
<220> FEATURE:
<223> OTHER INFORMATION: AnxA1tg primer

<400> SEQUENCE: 28
gtatggaatc tctctttgcc aagc                                            24

<210> SEQ ID NO 29
<211> LENGTH: 22
<212> TYPE: DNA
<213> ORGANISM: Artificial Sequence
<220> FEATURE:
<223> OTHER INFORMATION: AnxA1tg primer

<400> SEQUENCE: 29
achgatatgc acatcaggag gg                                              22
```